United States Patent
Smith

(10) Patent No.: US 8,203,486 B1
(45) Date of Patent: Jun. 19, 2012

(54) TRANSMITTER INDEPENDENT TECHNIQUES TO EXTEND THE PERFORMANCE OF PASSIVE COHERENT LOCATION

(75) Inventor: Alexander E. Smith, McLean, VA (US)

(73) Assignee: Omnipol A.S. (CZ)

( * ) Notice: Subject to any disclaimer, the term of this patent is extended or adjusted under 35 U.S.C. 154(b) by 1203 days.

(21) Appl. No.: 11/688,348

(22) Filed: Mar. 20, 2007

Related U.S. Application Data

(63) Continuation-in-part of application No. 11/492,711, filed on Jul. 25, 2006, now Pat. No. 7,429,950, and a continuation-in-part of application No. 11/429,926, filed on May 8, 2006, now Pat. No. 7,477,193, and a continuation-in-part of application No. 11/343,079, filed on Jan. 30, 2006, now Pat. No. 7,375,683, and a continuation-in-part of application No. 11/342,289, filed on Jan. 28, 2006, now Pat. No. 7,576,695, and a continuation-in-part of application No. 11/209,030, filed on Aug. 22, 2005, now Pat. No. 7,248,219, and a continuation-in-part of application No. 11/257,416, filed on Oct. 24, 2005, now Pat. No. 7,495,612, and a continuation-in-part of application No. 11/203,823, filed on Aug. 15, 2005, now Pat. No. 7,739,167, and a continuation-in-part of application No. 11/145,170, filed on Jun. 6, 2005, now Pat. No. 7,437,250, which is a continuation-in-part of application No. 10/743,042, filed on Dec. 23, 2003, now Pat. No. 7,132,982, which is a continuation-in-part of application No. 10/638,524, filed on Aug. 12, 2003, now Pat. No. 6,806,829, which is a continuation of application No. 09/516,215, filed on Feb. 29, 2000, now Pat. No. 6,633,259, said application No. 10/743,042 is a continuation-in-part of application No. 10/319,725, filed on Dec. 16, 2002, now Pat. No. 6,812,890, application No. 11/688,348, which is a continuation-in-part of application No. 11/649,350, filed on Jan. 30, 2007.

(60) Provisional application No. 60/123,170, filed on Mar. 5, 1999, provisional application No. 60/440,618, filed on Jan. 17, 2003.

(51) Int. Cl.
*G01S 3/02* (2006.01)

(52) U.S. Cl. ........................................ 342/452; 342/463

(58) Field of Classification Search .................. 342/442, 342/450, 453, 457, 463, 452; 701/117, 120
See application file for complete search history.

(56) References Cited

U.S. PATENT DOCUMENTS 1,738,571 A  12/1929  Gare ................................ 404/18
(Continued)

FOREIGN PATENT DOCUMENTS

DE  4306660 A1  8/1974
(Continued)

OTHER PUBLICATIONS

Terminal, Landing Fees Increase, Dianne Gouliquer, Northern Ontario Business, Sudbury, Apr. 1, 2001, vol. 21, Issue 6, p. 24.

(Continued)

*Primary Examiner* — Dao Phan
(74) *Attorney, Agent, or Firm* — Ostrolenk Faber LLP

(57) ABSTRACT

Methods to improve the performance of passive coherent location by non-reliance on a direct view of the signal source are described. Passive Coherent Location, or PCL, has become a promising technology as more computer-processing power has become generally available. Basically, most PCL techniques rely on comparing signal sources with their reflections from an object in order to determine the location of the object. However, this requires line of sight access from the receiver system to the signal source which may not always be practical and may limit the performance of the system overall. The techniques described herein do not require line of sight to the transmitter sources.

12 Claims, 7 Drawing Sheets

U.S. PATENT DOCUMENTS

| | | | | |
|---|---|---|---|---|
| 3,668,403 | A | 6/1972 | Meilander | 701/121 |
| 3,705,404 | A | 12/1972 | Chisholm | 343/112 R |
| 3,792,472 | A | 2/1974 | Payne et al. | 342/32 |
| 4,079,414 | A | 3/1978 | Sullivan | 725/114 |
| 4,115,771 | A | 9/1978 | Litchford | 343/6 R |
| 4,122,522 | A | 10/1978 | Smith | 701/15 |
| 4,167,006 | A | 9/1979 | Funatsu et al. | 343/6.5 LC |
| 4,196,474 | A | 4/1980 | Buchanan et al. | 364/461 |
| 4,224,669 | A | 9/1980 | Brame | 701/8 |
| 4,229,737 | A | 10/1980 | Heldwein et al. | 343/6 R |
| 4,315,609 | A | 2/1982 | McLean et al. | |
| 4,327,437 | A | 4/1982 | Frosch et al. | 714/3 |
| 4,359,733 | A | 11/1982 | O'Neill | 342/36 |
| 4,454,510 | A | 6/1984 | Crow | 343/5 |
| 4,524,931 | A | 6/1985 | Nilsson | 246/167 |
| 4,646,244 | A | 2/1987 | Bateman | 701/301 |
| 4,688,046 | A | 8/1987 | Schwab | 342/456 |
| 4,782,450 | A | 11/1988 | Flax | 364/461 |
| 4,811,308 | A | 3/1989 | Michel | 367/136 |
| 4,843,397 | A | 6/1989 | Galati et al. | 342/59 |
| 4,853,700 | A | 8/1989 | Funatsu et al. | 342/30 |
| 4,897,661 | A | 1/1990 | Hiraiwa | 342/457 |
| 4,899,296 | A | 2/1990 | Khattak | 702/40 |
| 4,910,526 | A | 3/1990 | Donnangelo et al. | 342/455 |
| 4,914,733 | A | 4/1990 | Gralnick | 340/961 |
| 4,958,306 | A | 9/1990 | Powell et al. | 702/40 |
| 5,001,490 | A | 3/1991 | Fichtner | 342/195 |
| 5,001,650 | A | 3/1991 | Francis et al. | 364/516 |
| 5,017,930 | A | 5/1991 | Stoltz | 342/465 |
| 5,025,382 | A | 6/1991 | Artz | 364/439 |
| 5,027,114 | A | 6/1991 | Kawashima et al. | 340/941 |
| 5,045,861 | A | 9/1991 | Duffett-Smith | 342/457 |
| 5,075,680 | A | 12/1991 | Dabbs | 342/52 |
| 5,075,694 | A | 12/1991 | Donnangelo et al. | 342/455 |
| 5,081,457 | A | 1/1992 | Motisher et al. | 342/40 |
| 5,089,822 | A | 2/1992 | Abaunza et al. | 342/30 |
| 5,113,193 | A | 5/1992 | Powell et al. | 342/25 |
| 5,119,102 | A | 6/1992 | Barnard | 342/357 |
| 5,132,695 | A | 7/1992 | Sumas et al. | 342/461 |
| 5,138,321 | A | 8/1992 | Hammer | 342/36 |
| 5,144,315 | A | 9/1992 | Schwab et al. | 342/49 |
| 5,153,836 | A | 10/1992 | Fraughton et al. | 364/461 |
| 5,179,384 | A | 1/1993 | De Haan | 342/37 |
| 5,191,342 | A | 3/1993 | Alsup et al. | 342/465 |
| 5,200,902 | A | 4/1993 | Pilley | 364/439 |
| 5,225,842 | A | 7/1993 | Brown et al. | 342/357 |
| 5,260,702 | A | 11/1993 | Thompson | 340/970 |
| 5,262,784 | A | 11/1993 | Drobnicki et al. | 342/45 |
| 5,265,023 | A | 11/1993 | Sokkappa | 364/439 |
| 5,268,698 | A | 12/1993 | Smith et al. | 342/450 |
| 5,283,574 | A | 2/1994 | Grove | 340/970 |
| 5,311,194 | A | 5/1994 | Brown | 342/357 |
| 5,317,316 | A | 5/1994 | Sturm et al. | 342/30 |
| 5,317,317 | A | 5/1994 | Billaud et al. | 342/40 |
| 5,339,281 | A | 8/1994 | Narendra et al. | 367/5 |
| 5,341,139 | A | 8/1994 | Billaud et al. | 342/40 |
| 5,365,516 | A | 11/1994 | Jandrell | 370/18 |
| 5,374,932 | A | 12/1994 | Wyschogrod et al. | 342/36 |
| 5,379,224 | A | 1/1995 | Brown et al. | 364/449 |
| 5,381,140 | A | 1/1995 | Kuroda et al. | 340/961 |
| 5,402,116 | A | 3/1995 | Ashley | 340/870.1 |
| 5,406,288 | A | 4/1995 | Billaud et al. | 342/37 |
| 5,424,746 | A | 6/1995 | Schwab et al. | 342/49 |
| 5,424,748 | A | 6/1995 | Pourailly et al. | 342/157 |
| 5,438,337 | A | 8/1995 | Aguado | 342/357 |
| 5,448,233 | A | 9/1995 | Saban et al. | 340/963 |
| 5,450,329 | A | 9/1995 | Tanner | 364/449 |
| 5,454,720 | A | 10/1995 | FitzGerald et al. | 434/27 |
| 5,455,586 | A | 10/1995 | Barbier et al. | 342/37 |
| 5,471,657 | A | 11/1995 | Gharpuray | 455/12.1 |
| 5,486,829 | A | 1/1996 | Potier et al. | 342/40 |
| 5,493,309 | A | 2/1996 | Bjornholt | 342/455 |
| 5,506,590 | A | 4/1996 | Minter | 342/462 |
| 5,515,286 | A | 5/1996 | Simon | 364/461 |
| 5,528,244 | A | 6/1996 | Schwab | 342/37 |
| 5,534,871 | A | 7/1996 | Hidaka et al. | 342/113 |
| 5,541,608 | A | 7/1996 | Murphy et al. | 342/442 |
| 5,570,095 | A | 10/1996 | Drouilhet, Jr. et al. | 342/357 |
| 5,570,099 | A | 10/1996 | DesJardins | 342/378 |
| 5,583,775 | A | 12/1996 | Nobe et al. | 364/449.7 |
| 5,590,044 | A | 12/1996 | Buckreub | 364/453 |
| 5,596,326 | A | 1/1997 | Fitts | 342/30 |
| 5,596,332 | A | 1/1997 | Coles et al. | 342/455 |
| 5,608,412 | A | 3/1997 | Welles, II et al. | 342/457 |
| 5,614,912 | A | 3/1997 | Mitchell | 342/146 |
| 5,617,101 | A | 4/1997 | Maine et al. | 342/358 |
| 5,627,546 | A | 5/1997 | Crow | 342/352 |
| 5,629,691 | A | 5/1997 | Jain | 340/961 |
| 5,635,693 | A | 6/1997 | Benson et al. | 235/384 |
| 5,659,319 | A | 8/1997 | Rost et al. | 342/36 |
| 5,666,110 | A | 9/1997 | Paterson | 340/970 |
| 5,670,960 | A | 9/1997 | Cessat | 342/25 |
| 5,670,961 | A | 9/1997 | Tomita et al. | 342/36 |
| 5,677,841 | A | 10/1997 | Shiomi et al. | 365/439 |
| 5,680,140 | A | 10/1997 | Loomis | 342/357 |
| 5,686,921 | A | 11/1997 | Okada et al. | 342/127 |
| 5,699,275 | A | 12/1997 | Beasley et al. | 364/464.27 |
| 5,714,948 | A | 2/1998 | Farmakis et al. | 340/961 |
| 5,732,384 | A | 3/1998 | Ellert et al. | 701/120 |
| 5,752,216 | A | 5/1998 | Carlson et al. | 701/120 |
| 5,757,314 | A | 5/1998 | Gounon et al. | 342/357 |
| 5,774,829 | A | 6/1998 | Cisneros et al. | 701/213 |
| 5,781,150 | A | 7/1998 | Norris | 342/357 |
| 5,784,022 | A | 7/1998 | Kupfer | 342/80 |
| 5,793,329 | A | 8/1998 | Nakada et al. | 342/357 |
| 5,798,712 | A | 8/1998 | Coquin | 340/970 |
| 5,802,542 | A | 9/1998 | Coiera et al. | 711/4 |
| 5,825,021 | A | 10/1998 | Uemura | 250/222.1 |
| 5,828,333 | A | 10/1998 | Richardson et al. | 342/70 |
| 5,839,080 | A | 11/1998 | Muller | 701/9 |
| 5,841,391 | A | 11/1998 | Lucas, Jr. et al. | 342/34 |
| 5,841,398 | A | 11/1998 | Brock | 342/357 |
| 5,850,420 | A | 12/1998 | Guillard et al. | 375/316 |
| 5,867,804 | A | 2/1999 | Pilley et al. | 701/120 |
| 5,872,526 | A | 2/1999 | Tognazzini | 340/961 |
| 5,884,222 | A | 3/1999 | Denoize et al. | 701/301 |
| 5,890,068 | A | 3/1999 | Fattouce et al. | 455/456.2 |
| 5,892,462 | A | 4/1999 | Tran | 340/961 |
| 5,913,912 | A | 6/1999 | Nishimura et al. | 701/35 |
| 5,920,277 | A | 7/1999 | Foster et al. | 342/32 |
| 5,920,318 | A | 7/1999 | Salvatore, Jr. et al. | 345/418 |
| 5,923,293 | A | 7/1999 | Smith et al. | 342/455 |
| 5,949,375 | A | 9/1999 | Ishiguro et al. | 342/457 |
| 5,969,674 | A | 10/1999 | Von der Embse et al. | 342/357.16 |
| 5,977,905 | A | 11/1999 | Le Chevalier | 342/163 |
| 5,979,234 | A | 11/1999 | Karlsen | 73/170.13 |
| 5,990,833 | A | 11/1999 | Ahlbom et al. | 342/417 |
| 5,991,687 | A | 11/1999 | Hale et al. | 701/207 |
| 5,995,040 | A | 11/1999 | Issler et al. | 342/352 |
| 5,999,116 | A | 12/1999 | Evers | 342/36 |
| 6,043,777 | A | 3/2000 | Bergman et al. | 342/357 |
| 6,044,322 | A | 3/2000 | Stieler | 701/120 |
| 6,049,304 | A | 4/2000 | Rudel et al. | 342/357.08 |
| 6,049,754 | A | 4/2000 | Beaton et al. | 701/204 |
| 6,075,479 | A | 6/2000 | Kudoh | 342/70 |
| 6,081,222 | A | 6/2000 | Henkel et al. | 342/45 |
| 6,081,764 | A | 6/2000 | Varon | 701/120 |
| 6,085,150 | A | 7/2000 | Henry et al. | 701/301 |
| 6,088,634 | A | 7/2000 | Muller | 701/9 |
| 6,092,009 | A | 7/2000 | Glover | 701/14 |
| 6,094,169 | A | 7/2000 | Smith et al. | 342/465 |
| 6,122,570 | A | 9/2000 | Muller | 701/9 |
| 6,127,944 | A | 10/2000 | Daly | 340/963 |
| 6,133,867 | A | 10/2000 | Eberwine et al. | 342/29 |
| 6,138,060 | A | 10/2000 | Conner | 701/9 |
| 6,147,748 | A | 11/2000 | Hughes | 356/4.09 |
| 6,161,097 | A | 12/2000 | Glass et al. | 705/6 |
| 6,178,363 | B1 | 1/2001 | McIntyre et al. | 701/16 |
| 6,188,937 | B1 | 2/2001 | Sherry et al. | 701/14 |
| 6,194,040 | B1 | 2/2001 | Delius et al. | 342/357.12 |
| 6,195,609 | B1 | 2/2001 | Pilley | 701/120 |
| 6,201,499 | B1 | 3/2001 | Hawkes et al. | 342/387 |
| 6,208,284 | B1 | 3/2001 | Woodell et al. | 342/30 |
| 6,208,937 | B1 | 3/2001 | Huddle | 701/221 |
| 6,211,811 | B1 | 4/2001 | Evers | 342/36 |
| 6,219,592 | B1 | 4/2001 | Muller et al. | 701/9 |

| Patent | Date | Inventor | Class |
|---|---|---|---|
| 6,222,480 B1 | 4/2001 | Kuntman et al. | 342/30 |
| 6,225,942 B1 | 5/2001 | Alon | 342/59 |
| 6,230,018 B1 | 5/2001 | Watters et al. | 455/456 |
| 6,233,522 B1 | 5/2001 | Morici | 701/208 |
| 6,239,739 B1 | 5/2001 | Thomson et al. | 342/96 |
| 6,240,345 B1 | 5/2001 | Vesel | 701/31 |
| 6,246,342 B1 | 6/2001 | Vandevoorde et al. | 340/961 |
| 6,253,147 B1 | 6/2001 | Greenstein | 701/202 |
| 6,271,768 B1 | 8/2001 | Frazier, Jr. et al. | 340/961 |
| 6,275,172 B1 | 8/2001 | Curtis et al. | 340/961 |
| 6,275,767 B1 | 8/2001 | Delseny et al. | 701/120 |
| 6,282,487 B1 | 8/2001 | Shiomi et al. | 701/120 |
| 6,282,488 B1 | 8/2001 | Castor et al. | 701/120 |
| 6,289,280 B1 | 9/2001 | Fernandez-Corbaton | 701/214 |
| 6,292,721 B1 | 9/2001 | Conner et al. | 701/9 |
| 6,311,127 B1 | 10/2001 | Stratton et al. | 701/213 |
| 6,314,361 B1 | 11/2001 | Yu et al. | 701/120 |
| 6,314,363 B1 | 11/2001 | Pilley et al. | 701/120 |
| 6,317,663 B1 | 11/2001 | Meunier et al. | 701/16 |
| 6,321,091 B1 | 11/2001 | Holland | 455/456 |
| 6,327,471 B1 | 12/2001 | Song | 455/440 |
| 6,329,947 B2 | 12/2001 | Smith | 342/418 |
| 6,337,652 B1 | 1/2002 | Shiomi et al. | 342/37 |
| 6,338,011 B1 | 1/2002 | Furst et al. | 701/1 |
| 6,339,745 B1 | 1/2002 | Novik | 701/208 |
| 6,340,935 B1 | 1/2002 | Hall | 340/932.2 |
| 6,340,947 B1 | 1/2002 | Chang et al. | 342/357.01 |
| 6,344,820 B1 | 2/2002 | Shiomi et al. | 342/174 |
| 6,347,263 B1 | 2/2002 | Johnson et al. | 701/14 |
| 6,348,856 B1 | 2/2002 | Jones et al. | 340/10.1 |
| 6,366,240 B1 | 4/2002 | Timothy et al. | 342/417 |
| 6,377,208 B2 | 4/2002 | Chang et al. | 342/357.01 |
| 6,380,869 B1 | 4/2002 | Simon et al. | 340/945 |
| 6,380,870 B1 | 4/2002 | Conner et al. | 340/970 |
| 6,384,783 B1 | 5/2002 | Smith et al. | 342/387 |
| 6,393,359 B1 | 5/2002 | Flynn et al. | 701/120 |
| 6,396,435 B1 | 5/2002 | Fleischhauer et al. | 342/70 |
| 6,408,233 B1 | 6/2002 | Solomon et al. | 701/35 |
| 6,414,629 B1 | 7/2002 | Curico | 342/357.08 |
| 6,415,219 B1 | 7/2002 | Degodyuk | 70/117 |
| 6,420,993 B1 | 7/2002 | Varon | 342/36 |
| 6,445,310 B1 | 9/2002 | Bateman et al. | 340/970 |
| 6,445,927 B1 | 9/2002 | Kng et al. | 455/456 |
| 6,448,929 B1 | 9/2002 | Smith et al. | 342/456 |
| 6,459,411 B2 | 10/2002 | Frazier et al. | 342/455 |
| 6,462,674 B2 | 10/2002 | Ohmura et al. | 340/901 |
| 6,463,383 B1 | 10/2002 | Baiada et al. | 701/120 |
| 6,469,654 B1 | 10/2002 | Winner et al. | 342/33 |
| 6,469,655 B1 | 10/2002 | Franke et al. | 342/36 |
| 6,469,664 B1 | 10/2002 | Michaelson et al. | 342/357.13 |
| 6,473,027 B1 | 10/2002 | Alon | 342/37 |
| 6,473,694 B1 | 10/2002 | Akopian et al. | 701/213 |
| 6,477,449 B1 | 11/2002 | Conner et al. | 701/4 |
| 6,492,932 B1 | 12/2002 | Jin et al. | 342/25 |
| 6,493,610 B1 | 12/2002 | Ezaki | 701/3 |
| 6,504,490 B2 | 1/2003 | Mizushima | 340/943 |
| 6,518,916 B1 | 2/2003 | Ashihara et al. | 342/70 |
| 6,522,295 B2 | 2/2003 | Baugh et al. | 342/453 |
| 6,531,978 B2 | 3/2003 | Tran | 342/29 |
| 6,542,809 B2 | 4/2003 | Hehls, III | 701/120 |
| 6,542,810 B2 | 4/2003 | Lai | 701/120 |
| 6,545,631 B2 | 4/2003 | Hudson et al. | 342/30 |
| 6,549,829 B1 | 4/2003 | Anderson et al. | 701/16 |
| 6,563,432 B1 | 5/2003 | Millgard | 340/961 |
| 6,567,043 B2 | 5/2003 | Smith et al. | 342/450 |
| 6,571,155 B2 | 5/2003 | Carriker et al. | 701/3 |
| 6,584,400 B2 | 6/2003 | Beardsworth | 701/120 |
| 6,584,414 B1 | 6/2003 | Green et al. | 702/33 |
| 6,587,079 B1 | 7/2003 | Rickard et al. | 342/387 |
| 6,606,034 B1 | 8/2003 | Muller et al. | 340/970 |
| 6,606,563 B2 | 8/2003 | Corcoran, III | 701/301 |
| 6,615,648 B1 | 9/2003 | Ferguson et al. | 73/146 |
| 6,617,997 B2 | 9/2003 | Ybarra et al. | 342/29 |
| 6,618,008 B1 | 9/2003 | Scholz | 342/427 |
| 6,633,259 B1 | 10/2003 | Smith et al. | 342/456 |
| 6,657,578 B2 | 12/2003 | Stayton et al. | 342/30 |
| 6,680,687 B2 | 1/2004 | Phelipot | 342/29 |
| 6,690,295 B1 | 2/2004 | De Boer | 340/951 |
| 6,690,618 B2 | 2/2004 | Tomasi et al. | 367/127 |
| 6,691,004 B2 | 2/2004 | Johnson | 701/14 |
| 6,707,394 B2 | 3/2004 | Ishihara et al. | 340/970 |
| 6,710,719 B1 | 3/2004 | Jones et al. | 340/825.49 |
| 6,710,723 B2 | 3/2004 | Muller | 340/970 |
| 6,714,782 B1 | 3/2004 | Monot et al. | 455/431 |
| 6,721,652 B1 | 4/2004 | Sanqunetti | 701/207 |
| 6,744,396 B2 | 6/2004 | Stone et al. | 342/36 |
| 6,750,815 B2 | 6/2004 | Michaelson et al. | 342/357.13 |
| 6,751,545 B2 | 6/2004 | Walter | 701/120 |
| 6,760,387 B2 | 7/2004 | Langford et al. | 375/267 |
| 6,765,533 B2 | 7/2004 | Szajnowski | 342/465 |
| 6,789,011 B2 | 9/2004 | Baiada et al. | 701/120 |
| 6,789,016 B2 | 9/2004 | Bayh et al. | 701/301 |
| 6,792,058 B1 | 9/2004 | Hershey et al. | 375/347 |
| 6,798,381 B2 | 9/2004 | Benner et al. | 342/450 |
| 6,799,114 B2 | 9/2004 | Etnyre | 701/120 |
| 6,801,152 B1 | 10/2004 | Rose | 342/13 |
| 6,801,155 B2 | 10/2004 | Jahangir et al. | 342/90 |
| 6,809,679 B2 | 10/2004 | LaFrey et al. | 342/37 |
| 6,810,329 B2 | 10/2004 | Koga | 701/211 |
| 6,812,890 B2 | 11/2004 | Smith et al. | 342/454 |
| 6,816,105 B2 | 11/2004 | Winner et al. | 342/37 |
| 6,819,282 B1 | 11/2004 | Galati et al. | 342/37 |
| 6,823,188 B1 | 11/2004 | Stern | 455/456.1 |
| 6,828,921 B2 | 12/2004 | Brown et al. | 340/945 |
| 6,845,362 B2 | 1/2005 | Furuta et al. | 705/13 |
| 6,861,982 B2 | 3/2005 | Forstrom et al. | 342/387 |
| 6,862,519 B2 | 3/2005 | Walter | 701/120 |
| 6,862,541 B2 | 3/2005 | Mizushima | 702/26 |
| 6,865,484 B2 | 3/2005 | Miyasaka et al. | 701/213 |
| 6,873,269 B2 | 3/2005 | Tran | 340/961 |
| 6,873,903 B2 | 3/2005 | Baiada et al. | 701/120 |
| 6,876,859 B2 | 4/2005 | Anderson et al. | 455/456.1 |
| 6,882,930 B2 | 4/2005 | Trayford et al. | 701/117 |
| 6,885,340 B2 | 4/2005 | Smith et al. | 342/465 |
| 6,900,760 B2 | 5/2005 | Groves | 342/357.14 |
| 6,912,461 B2 | 6/2005 | Poreda | 701/120 |
| 6,927,701 B2 | 8/2005 | Schmidt et al. | 340/959 |
| 6,930,638 B2 | 8/2005 | Lloyd et al. | 342/453 |
| 6,952,631 B2 | 10/2005 | Griffith et al. | 701/13 |
| 6,963,304 B2 | 11/2005 | Murphy | 342/357.02 |
| 6,967,616 B2 | 11/2005 | Etnyre | 342/182 |
| 6,977,612 B1 | 12/2005 | Bennett | 342/357.07 |
| 6,985,103 B2 | 1/2006 | Ridderheim et al. | 342/30 |
| 6,985,743 B2 | 1/2006 | Bajikar | 455/456.1 |
| 6,992,626 B2 | 1/2006 | Smith | 342/454 |
| 7,006,032 B2 | 2/2006 | King et al. | 342/29 |
| 7,012,522 B2 | 3/2006 | Le Van | 340/945 |
| 7,026,987 B2 | 4/2006 | Lokshin et al. | 342/357.12 |
| 7,030,780 B2 | 4/2006 | Shiomi et al. | 340/961 |
| 7,043,355 B2 | 5/2006 | Lai | 701/120 |
| 7,050,909 B2 | 5/2006 | Nichols et al. | 701/301 |
| 7,053,792 B2 | 5/2006 | Aoki et al. | 340/928 |
| 7,058,506 B2 | 6/2006 | Kawase et al. | 701/201 |
| 7,062,381 B1 | 6/2006 | Rekow et al. | 701/300 |
| 7,065,443 B2 | 6/2006 | Flynn et al. | 701/120 |
| 7,071,843 B2 | 7/2006 | Hashida et al. | 340/995.12 |
| 7,071,867 B2 | 7/2006 | Wittenberg et al. | 342/70 |
| 7,079,925 B2 | 7/2006 | Kubota et al. | 701/1 |
| 7,095,360 B2 | 8/2006 | Kuji et al. | 342/29 |
| 7,102,570 B2 | 9/2006 | Bar-On et al. | 342/465 |
| 7,106,212 B2 | 9/2006 | Konishi et al. | 340/905 |
| 7,109,889 B2 | 9/2006 | He | 340/971 |
| 7,117,089 B2 | 10/2006 | Khatwa et al. | 701/301 |
| 7,120,537 B2 | 10/2006 | Flynn et al. | 701/120 |
| 7,123,169 B2 | 10/2006 | Farmer et al. | 340/945 |
| 7,123,192 B2 | 10/2006 | Smith et al. | 342/455 |
| 7,126,534 B2 | 10/2006 | Smith et al. | 342/456 |
| 7,136,059 B2 | 11/2006 | Kraud et al. | 345/419 |
| 7,142,154 B2 | 11/2006 | Quilter et al. | 342/357.06 |
| 7,148,816 B1 | 12/2006 | Carrico | 340/961 |
| 7,155,240 B2 | 12/2006 | Atkinson et al. | 455/456.2 |
| 7,164,986 B2 | 1/2007 | Humphries et al. | 701/207 |
| 7,170,441 B2 | 1/2007 | Perl et al. | 342/29 |
| 7,170,820 B2 | 1/2007 | Szajnowski | 367/127 |
| 7,187,327 B2 | 3/2007 | Coluzzi et al. | 342/458 |
| 7,190,303 B2 | 3/2007 | Rowlan | 342/29 |
| 7,196,621 B2 | 3/2007 | Kochis | 340/539.13 |
| 7,206,698 B2 | 4/2007 | Conner et al. | 701/301 |

| | | | | | | |
|---|---|---|---|---|---|---|
| 7,218,276 B2 | 5/2007 | Teranishi | 342/357.1 | 2006/0167598 A1 | 7/2006 | Pennarola | 701/11 |
| 7,218,278 B1 | 5/2007 | Arethens | 342/367.03 | 2006/0181447 A1 | 8/2006 | Kuji et al. | 342/32 |
| 7,221,308 B2 | 5/2007 | Burton et al. | 342/42 | 2006/0191326 A1 | 8/2006 | Smith et al. | 73/73 |
| 7,228,207 B2 | 6/2007 | Clarke et al. | 701/3 | 2006/0208924 A1 | 9/2006 | Matalon | 340/933 |
| 7,233,545 B2 | 6/2007 | Harvey, Jr. et al. | 367/127 | 2006/0250305 A1 | 11/2006 | Coluzzi et al. | 342/458 |
| 7,248,963 B2 | 7/2007 | Baiada et al. | 701/120 | 2006/0262014 A1 | 11/2006 | Shemesh et al. | 342/386 |
| 7,250,901 B2 | 7/2007 | Stephens | 342/146 | 2006/0265664 A1 | 11/2006 | Simons et al. | 715/722 |
| 7,257,469 B1 | 8/2007 | Pemble | 701/3 | 2006/0276201 A1 | 12/2006 | Dupray | 455/456.1 |
| 7,272,495 B2 | 9/2007 | Coluzzi et al. | 701/207 | 2007/0001903 A1 | 1/2007 | Smith et al. | 342/387 |
| 7,277,052 B2 | 10/2007 | Delaveau et al. | 342/387 | 2007/0040734 A1 | 2/2007 | Evers et al. | 342/126 |
| 7,286,624 B2 | 10/2007 | Woo et al. | 375/356 | 2007/0060079 A1 | 3/2007 | Nakagawa et al. | 455/131 |
| 7,307,578 B2 | 12/2007 | Blaskovich et al. | 342/29 | 2007/0090295 A1 | 4/2007 | Parkinson et al. | 250/349 |
| 7,308,343 B1 | 12/2007 | Horvath et al. | 701/3 | 2007/0106436 A1 | 5/2007 | Johansson | 701/23 |
| 7,321,813 B2 | 1/2008 | Meunier | 701/10 | 2007/0109184 A1 | 5/2007 | Shyr et al. | 342/357.06 |
| 7,333,052 B2 | 2/2008 | Maskell | 342/195 | 2007/0159356 A1 | 7/2007 | Borel et al. | 340/945 |
| 7,333,887 B2 | 2/2008 | Baiada et al. | 701/120 | 2007/0159359 A1 | 7/2007 | Powers et al. | 342/29 |
| 7,352,318 B2 | 4/2008 | Osman et al. | 342/37 | 2007/0182589 A1 | 8/2007 | Tran | 340/961 |
| 7,358,854 B2 | 4/2008 | Egner et al. | 340/539.13 | 2007/0213887 A1 | 9/2007 | Woodings | 701/1 |
| 7,379,165 B2 | 5/2008 | Anderson et al. | 356/5.05 | 2007/0222665 A1 | 9/2007 | Koeneman | 342/29 |
| 7,382,286 B2 | 6/2008 | Cole et al. | 340/961 | 2007/0250259 A1 | 10/2007 | Dare | 701/201 |
| 7,383,104 B2 | 6/2008 | Ishii et al. | 701/3 | 2007/0252750 A1 | 11/2007 | Jean et al. | 342/40 |
| 7,383,124 B1 | 6/2008 | Vesel | 701/200 | 2007/0298786 A1 | 12/2007 | Meyers et al. | 455/431 |
| 7,385,527 B1 | 6/2008 | Clavier et al. | 340/945 | 2008/0027596 A1 | 1/2008 | Conner et al. | 701/16 |
| 7,391,359 B2 | 6/2008 | Ootomo et al. | 342/37 | 2008/0042880 A1 | 2/2008 | Ramaiah et al. | 340/958 |
| 7,398,157 B2 | 7/2008 | Sigurdsson et al. | 701/213 | 2008/0042902 A1 | 2/2008 | Brandwood et al. | 342/465 |
| 7,400,297 B2 | 7/2008 | Ferreol et al. | 342/377 | 2008/0062011 A1 | 3/2008 | Butler et al. | 340/961 |
| 7,408,497 B2 | 8/2008 | Billaud et al. | 342/30 | 2008/0063123 A1 | 3/2008 | De Mey et al. | 375/350 |
| 7,408,498 B2 | 8/2008 | Kuji et al. | 342/37 | 2008/0068250 A1 | 3/2008 | Brandao et al. | 342/30 |
| 7,420,501 B2 | 9/2008 | Perl | 342/30 | 2008/0088508 A1 | 4/2008 | Smith | 342/453 |
| 7,430,218 B2 | 9/2008 | Lee et al. | 370/464 | 2008/0106438 A1 | 5/2008 | Clark et al. | 340/972 |
| 7,437,225 B1 | 10/2008 | Rathinam | 701/14 | 2008/0106457 A1 | 5/2008 | Bartolini et al. | 342/40 |
| 7,440,846 B2 | 10/2008 | Irie et al. | 701/200 | 2008/0109343 A1 | 5/2008 | Robinson et al. | 705/37 |
| 7,457,690 B2 | 11/2008 | Wilson, Jr. | 701/3 | 2008/0117106 A1 | 5/2008 | Sarno et al. | 342/444 |
| 7,460,866 B2 | 12/2008 | Salkini et al. | 455/431 | 2008/0120032 A1 | 5/2008 | Brandao et al. | 701/300 |
| 7,460,871 B2 | 12/2008 | Humphries et al. | 455/456.1 | 2008/0129601 A1 | 6/2008 | Thomas | 342/465 |
| 7,477,145 B2 | 1/2009 | Tatton et al. | 340/531 | 2008/0132270 A1 | 6/2008 | Basir | 455/550.1 |
| 7,479,919 B2 | 1/2009 | Poe et al. | 342/30 | 2008/0137524 A1 | 6/2008 | Anderson et al. | 370/203 |
| 7,479,922 B2 | 1/2009 | Hunt et al. | 342/357.02 | 2008/0150784 A1 | 6/2008 | Zhang et al. | 342/30 |
| 7,479,923 B2 | 1/2009 | Carpenter | 342/357.02 | 2008/0158040 A1 | 7/2008 | Stayton et al. | 342/32 |
| 7,479,925 B2 | 1/2009 | Schell | 342/455 | 2008/0158059 A1 | 7/2008 | Bull et al. | 342/387 |
| 7,487,108 B2 | 2/2009 | Aoki et al. | 705/13 | 2008/0174472 A1 | 7/2008 | Stone et al. | 342/30 |
| 7,501,977 B2 | 3/2009 | Ino | 342/37 | 2008/0183344 A1 | 7/2008 | Doyen et al. | 701/9 |
| 7,504,996 B2 | 3/2009 | Martin | 342/357.12 | 2008/0186224 A1 | 8/2008 | Ichiyanagi et al. | 342/109 |
| 7,515,715 B2 | 4/2009 | Olive | 380/255 | 2008/0186231 A1 | 8/2008 | Aljadeff et al. | 342/387 |
| 2001/0014847 A1 | 8/2001 | Keenan | 701/117 | 2008/0195309 A1 | 8/2008 | Prinzel, III et al. | 701/208 |
| 2001/0026240 A1 | 10/2001 | Neher | 342/357.07 | 2008/0231494 A1 | 9/2008 | Galati | 342/37 |
| 2002/0021247 A1 | 2/2002 | Smith et al. | 342/450 | 2008/0252528 A1 | 10/2008 | Shen et al. | 342/451 |
| 2002/0089433 A1 | 7/2002 | Bateman et al. | 340/970 | 2008/0266166 A1 | 10/2008 | Schuchman | 342/97 |
| 2002/0152029 A1 | 10/2002 | Sainthuile et al. | 701/301 | 2008/0272227 A1 | 11/2008 | Sharpe | 244/3.16 |
| 2003/0004641 A1 | 1/2003 | Corwin et al. | 701/301 | 2008/0275642 A1 | 11/2008 | Clark et al. | 701/208 |
| 2003/0009267 A1 | 1/2003 | Dunsky et al. | 701/4 | 2008/0294306 A1 | 11/2008 | Huynh et al. | 701/3 |
| 2003/0060941 A1 | 3/2003 | Griffith et al. | 701/3 | 2008/0297398 A1 | 12/2008 | Kamimura | 342/38 |
| 2003/0097216 A1 | 5/2003 | Etnyre | 701/117 | 2009/0005960 A1 | 1/2009 | Roberts et al. | 701/120 |
| 2003/0152248 A1 | 8/2003 | Spark et al. | 382/103 | 2009/0009357 A1 | 1/2009 | Heen et al. | 340/825.09 |
| 2003/0158799 A1 | 8/2003 | Kakihara et al. | 705/30 | 2009/0012660 A1 | 1/2009 | Roberts et al. | 701/3 |
| 2004/0002886 A1 | 1/2004 | Dickerson et al. | | 2009/0012661 A1 | 1/2009 | Louis | 701/9 |
| 2004/0004554 A1 | 1/2004 | Srinivasan et al. | 340/870.01 | 2009/0015471 A1 | 1/2009 | Shen et al. | 342/357.15 |
| 2004/0039806 A1 | 2/2004 | Miras | 709/223 | 2009/0027270 A1 | 1/2009 | Fisher et al. | 342/37 |
| 2004/0044463 A1 | 3/2004 | Shen-Feng et al. | 701/120 | 2009/0051570 A1 | 2/2009 | Clark et al. | 340/971 |
| 2004/0086121 A1 | 5/2004 | Viggiano et al. | 380/255 | 2009/0055038 A1 | 2/2009 | Garrec et al. | 701/17 |
| 2004/0094622 A1 | 5/2004 | Vismara | 235/384 | | | | |
| 2004/0210371 A1 | 10/2004 | Adachi et al. | 701/50 | | | | |
| 2004/0225432 A1 | 11/2004 | Pilley et al. | 701/117 | | | | |
| 2004/0266341 A1 | 12/2004 | Teunon | 455/12.1 | | | | |
| 2005/0007272 A1 | 1/2005 | Smith et al. | 342/189 | | | | |
| 2005/0021283 A1 | 1/2005 | Brinton et al. | 702/150 | | | | |
| 2005/0046569 A1 | 3/2005 | Spriggs et al. | 340/551 | | | | |
| 2005/0057395 A1 | 3/2005 | Atkinson | | | | | |
| 2005/0159170 A1 | 7/2005 | Puranik et al. | 455/456.1 | | | | |
| 2005/1066672 | 8/2005 | Atkinson | 73/290 | | | | |
| 2005/0192717 A1 | 9/2005 | Tafs et al. | 701/3 | | | | |
| 2005/0228715 A1 | 10/2005 | Hartig et al. | 705/13 | | | | |
| 2005/0231422 A1 | 10/2005 | Etnyre | 342/182 | | | | |
| 2006/0023655 A1 | 2/2006 | Engel et al. | 370/328 | | | | |
| 2006/0044184 A1 | 3/2006 | Kimura | 342/357.09 | | | | |
| 2006/0052933 A1 | 3/2006 | Ota | 701/200 | | | | |
| 2006/0119515 A1 | 6/2006 | Smith | 342/450 | | | | |
| 2006/0129310 A1 | 6/2006 | Tarrant et al. | 701/201 | | | | |
| 2006/0161340 A1 | 7/2006 | Lee | 701/207 | | | | |

FOREIGN PATENT DOCUMENTS

| | | |
|---|---|---|
| DE | 4204164 A1 | 8/1993 |
| DE | 19751092 A1 | 6/1999 |
| DE | 10149006 A1 | 4/2003 |
| DE | 202004007747 U1 | 9/2004 |
| DE | 202006005089 U1 | 6/2006 |
| DE | 102006009121 A1 | 8/2007 |
| EP | 0265902 A2 | 5/1988 |
| EP | 0346461 A1 | 12/1989 |
| EP | 0466239 | 1/1992 |
| EP | 0514826 A1 | 11/1992 |
| EP | 0550073 A2 | 7/1993 |
| EP | 0574009 A3 | 6/1994 |
| EP | 0613110 A1 | 8/1994 |
| EP | 0613111 A1 | 8/1994 |
| EP | 0614092 A1 | 9/1994 |
| EP | 0629877 A1 | 12/1994 |
| EP | 0355336 B1 | 8/1995 |

| | | | | | | |
|---|---|---|---|---|---|---|
| EP | 0670566 | A2 | 9/1995 | FR | 2881841 A1 | 8/2006 |
| EP | 0682332 | A1 | 11/1995 | JP | 9-288175 A | 11/1994 |
| EP | 0505827 | B1 | 6/1996 | JP | 6-342061 A | 12/1994 |
| EP | 0385600 | B1 | 7/1996 | JP | 8-146130 A | 5/1996 |
| EP | 0732596 | A2 | 9/1996 | JP | 9-119983 A | 11/1996 |
| EP | 0487940 | B1 | 1/1997 | WO | WO9205456 A1 | 4/1992 |
| EP | 0774148 | A1 | 5/1997 | WO | WO 94/014251 | 6/1994 |
| EP | 0578316 | B1 | 4/1998 | WO | WO9427161 A1 | 11/1994 |
| EP | 0915349 | A1 | 5/1999 | WO | WO9428437 A1 | 12/1994 |
| EP | 1022580 | A3 | 2/2001 | WO | WO9503598 A1 | 2/1995 |
| EP | 1118871 | A2 | 7/2001 | WO | WO9521388 A1 | 8/1995 |
| EP | 0877997 | B1 | 12/2001 | WO | WO9605562 A1 | 2/1996 |
| EP | 0778470 | B1 | 5/2002 | WO | WO9635961 A1 | 11/1996 |
| EP | 1202233 | A1 | 5/2002 | WO | WO9726552 A2 | 7/1997 |
| EP | 0865004 | B1 | 7/2002 | WO | WO9747173 A2 | 12/1997 |
| EP | 1109032 | B1 | 3/2003 | WO | WO9804965 A2 | 2/1998 |
| EP | 1300689 | A2 | 4/2003 | WO | WO9805977 A1 | 2/1998 |
| EP | 1331620 | A1 | 7/2003 | WO | WO9814926 A1 | 4/1998 |
| EP | 1345044 | A1 | 9/2003 | WO | WO9822834 A1 | 5/1998 |
| EP | 1369704 | A1 | 12/2003 | WO | WO9822923 A1 | 5/1998 |
| EP | 1302920 | B1 | 2/2004 | WO | WO9835311 A1 | 8/1998 |
| EP | 1396832 | A1 | 3/2004 | WO | WO9843107 A1 | 10/1998 |
| EP | 1406228 | A2 | 4/2004 | WO | WO9849654 A1 | 11/1998 |
| EP | 1070968 | B1 | 5/2004 | WO | WO9908251 A1 | 2/1999 |
| EP | 1431946 | A1 | 6/2004 | WO | WO9935630 A1 | 7/1999 |
| EP | 1467575 | A1 | 10/2004 | WO | WO9942855 A1 | 8/1999 |
| EP | 1471365 | | 10/2004 | WO | WO9945519 A2 | 9/1999 |
| EP | 0903589 | B1 | 11/2004 | WO | WO 99/50985 | 10/1999 |
| EP | 1517281 | A2 | 3/2005 | WO | WO9950985 | 10/1999 |
| EP | 1531340 | A1 | 5/2005 | WO | WO9956144 A1 | 11/1999 |
| EP | 0926510 | B1 | 8/2005 | WO | WO0023816 A1 | 4/2000 |
| EP | 1405286 | B1 | 9/2005 | WO | WO0039775 A2 | 7/2000 |
| EP | 1485730 | B1 | 9/2005 | WO | WO0111389 A1 | 2/2001 |
| EP | 1428195 | B1 | 10/2005 | WO | WO0133302 A2 | 5/2001 |
| EP | 1603098 | A1 | 12/2005 | WO | WO0148652 A1 | 7/2001 |
| EP | 1125415 | B1 | 1/2006 | WO | WO0157550 A1 | 8/2001 |
| EP | 1205732 | B1 | 3/2006 | WO | WO0159601 A1 | 8/2001 |
| EP | 1632787 | A1 | 3/2006 | WO | WO0163239 A1 | 8/2001 |
| EP | 1632892 | A2 | 3/2006 | WO | WO0165276 A1 | 9/2001 |
| EP | 0953261 | B1 | 6/2006 | WO | WO 0186319 | 11/2001 |
| EP | 1275975 | B1 | 6/2006 | WO | WO0186319 | 11/2001 |
| EP | 1285232 | B1 | 6/2006 | WO | WO0194969 A2 | 12/2001 |
| EP | 1672384 | A2 | 6/2006 | WO | WO0205245 A2 | 1/2002 |
| EP | 0987562 | B1 | 7/2006 | WO | WO0208784 A1 | 1/2002 |
| EP | 1093564 | B1 | 11/2006 | WO | WO0215151 A1 | 2/2002 |
| EP | 1218694 | B1 | 11/2006 | WO | WO0227275 A2 | 4/2002 |
| EP | 1727094 | A2 | 11/2006 | WO | WO02054103 A2 | 7/2002 |
| EP | 1742170 | A1 | 1/2007 | WO | WO02059838 A1 | 8/2002 |
| EP | 1188137 | B1 | 2/2007 | WO | WO02066288 A1 | 8/2002 |
| EP | 1755356 | A1 | 2/2007 | WO | WO02069300 A1 | 9/2002 |
| EP | 1463002 | B1 | 4/2007 | WO | WO02075667 A1 | 9/2002 |
| EP | 1361555 | B1 | 5/2007 | WO | WO02091312 A2 | 11/2002 |
| EP | 1798572 | A1 | 6/2007 | WO | WO02095709 A2 | 11/2002 |
| EP | 1410364 | B1 | 10/2007 | WO | WO02099769 | 12/2002 |
| EP | 1843161 | A2 | 10/2007 | WO | WO03013010 A1 | 2/2003 |
| EP | 1860456 | A1 | 11/2007 | WO | WO03016937 A1 | 2/2003 |
| EP | 1884462 | A1 | 2/2008 | WO | WO03023439 A2 | 3/2003 |
| EP | 1101385 | B1 | 3/2008 | WO | WO03027934 A1 | 4/2003 |
| EP | 1901090 | A1 | 3/2008 | WO | WO03054830 A2 | 7/2003 |
| EP | 0964268 | B1 | 4/2008 | WO | WO03056495 A1 | 7/2003 |
| EP | 1483755 | B1 | 4/2008 | WO | WO03060855 A1 | 7/2003 |
| EP | 1906204 | A2 | 4/2008 | WO | WO03067281 A1 | 8/2003 |
| EP | 1912077 | A2 | 4/2008 | WO | WO03079136 A2 | 9/2003 |
| EP | 1331490 | B1 | 6/2008 | WO | WO03081560 A1 | 10/2003 |
| EP | 1942351 | A1 | 7/2008 | WO | WO03093775 A2 | 11/2003 |
| EP | 1327159 | B1 | 8/2008 | WO | WO03096282 A1 | 11/2003 |
| EP | 1436641 | B1 | 8/2008 | WO | WO03098576 A1 | 11/2003 |
| EP | 1953565 | A1 | 8/2008 | WO | WO03107299 A2 | 12/2003 |
| EP | 1483902 | B1 | 9/2008 | WO | WO2004042418 A1 | 5/2004 |
| EP | 1965219 | A1 | 9/2008 | WO | WO2004068162 A2 | 8/2004 |
| EP | 1972962 | A2 | 9/2008 | WO | WO2004109317 A2 | 12/2004 |
| EP | 1975884 | A1 | 10/2008 | WO | WO2004114252 A1 | 12/2004 |
| EP | 1118011 | B1 | 11/2008 | WO | WO2005038478 A2 | 4/2005 |
| EP | 1995708 | A1 | 11/2008 | WO | WO2005052887 A1 | 6/2005 |
| EP | 2000778 | A2 | 12/2008 | WO | WO2005081012 A1 | 9/2005 |
| EP | 2001004 | A2 | 12/2008 | WO | WO2005081630 A2 | 9/2005 |
| EP | 2023155 | A1 | 2/2009 | WO | WO2005114613 A1 | 12/2005 |
| FR | 2708349 | A1 | 2/1995 | WO | WO2005121701 A2 | 12/2005 |
| FR | 2791778 | A1 | 10/2000 | WO | WO2005017555 A2 | 5/2006 |

| | | | |
|---|---|---|---|
| WO | WO2006070207 A1 | 7/2006 |
| WO | WO2006079165 A1 | 8/2006 |
| WO | WO2006093682 A2 | 9/2006 |
| WO | WO2006108275 A1 | 10/2006 |
| WO | WO2006110973 A1 | 10/2006 |
| WO | WO2006135916 A1 | 12/2006 |
| WO | WO2006135923 A2 | 12/2006 |
| WO | WO2007001660 A2 | 1/2007 |
| WO | WO2007010116 A1 | 1/2007 |
| WO | WO2007012888 A1 | 2/2007 |
| WO | WO2007013069 A1 | 2/2007 |
| WO | WO2007048237 A1 | 5/2007 |
| WO | WO2007086899 A2 | 8/2007 |
| WO | WO2006088554 A1 | 9/2007 |
| WO | WO2007113469 A1 | 10/2007 |
| WO | WO2007115246 A1 | 10/2007 |
| WO | WO2007120588 A2 | 10/2007 |
| WO | WO2007124300 A2 | 11/2007 |
| WO | WO2008001117 A1 | 1/2008 |
| WO | WO2008005012 A1 | 1/2008 |
| WO | WO2008012377 A1 | 1/2008 |
| WO | WO2008018088 A1 | 2/2008 |
| WO | WO2008051292 A2 | 5/2008 |
| WO | WO2008053173 A1 | 5/2008 |
| WO | WO2008065328 A2 | 6/2008 |
| WO | WO2008065658 A1 | 6/2008 |
| WO | WO2008068679 A1 | 6/2008 |
| WO | WO2008093036 A2 | 8/2008 |
| WO | WO2008116580 A1 | 10/2008 |
| WO | WO2008126126 A2 | 10/2008 |
| WO | WO2008144784 A1 | 12/2008 |
| WO | WO2008145986 A2 | 12/2008 |
| WO | WO2009001294 A2 | 12/2008 |
| WO | WO2009004381 A1 | 1/2009 |

OTHER PUBLICATIONS

Conflict Detection and Resolution for Future Air Transport Management, Jimmy Krozel, Ph.D, Mark E. Peters, and George Hunter, TR 97138-01, NASA Ames Research Center, Contract NAS2-14285, Apr. 1997.
ADS-X—Next Generation Surveillance Solutions, Alex Smith, Russell Hulstron, Rannoch Corporation, ATCA Oct. 2006.
Transtech Airport Solutions, Inc., http://www.transtech-solutions.com/products/asm/airport.html, Feb. 12, 2009.
Eurocontrol Standard Document for Surveillance Interchange Part 14: Category 020, Multilateration Target Reports, Sur.ET1.ST05. 2000-STD-14-02, Apr. 2008.
ATO Advanced Technology Development and Prototyping Group, http://222.faa.gov/about/office_org/headquarters_offices/ato/service_units/operations/td/.. Jan. 16, 2008.
Form B—Proposal Summary, NASA SBIR 02-1 Solicitation, http://sbir.nasa.gov/SBIR/abstracts/02/sbir/phase1/SBIR-02-1-A3.01-9714.html Sep. 5, 2002.
Form 9B—Project Summary, NASA SBIR 00-1 Soliciation http://sbir.nasa.gov/SBIR/abstracts/00/sbir/phase1/SBIR-00-1-04.01-9704.html Feb. 12, 2009.
NASA 1998 SBIR Phase 1, Proposal No. 91-1 01.02-9780B (1998) http://sbir.nasa.gov/SBIR/abstracts/98/sbir/phase1/SBIR-98-1-01. 02-9780B.html.
Traffic Alert System Technical Design Summary, Final Report, Apr. 1994 (Baldwin et al.).
GPS Relative Accuracy for Collision Avoidance, Institute of Navigation Technical Meeting, Jan. 1997 (Rudel et al.).
Cassell, R., Smith A., Cohen, B., Yang, E., Sleep, B., A Prototype Aircraft Performance Risk Assessment Model, Final Report, Rannoch Corporation, Feb. 28, 2002.
Cassell, R., Smith A., Cohen, B., Yang, E., Sleep, B., Esche, J., Aircraft Performance Risk Assessment Model (APRAM), Rannoch Corporation, Nov. 30, 2002.
Cox, E., A., Fuzzy Logic for Business and Industry, Charles River Media, 1995, Chapter 5.
Smith, A., Cassell, R., Cohen, B., An approach to Aircraft Performance Risk Assessment Modeling, Final Report, Rannoch Corporation, Mar. 1999.

M.L. Wood and R. W. Bush, "Multilateration on Mode S and ATCRBS Signals at Atlanta's Hartsfield Airport", Lincoln Laboratory, M.I.T., Jan. 8, 1998.
AERMOD: Description of Model Formulation (Version 02222) EPA 454/R-02-002d, Oct. 21, 2002.
FAA Integrated Noise Model, www.faa.gov, current release INM 6.1 (Mar. 4, 2003).
"Flight Explorer News: Flight Explorer and Lochard Team to Provide Enhanced Flight Tracking for Cutomers Worldwide", Apr. 28, 2003, http://www.flightexplorer/com/News/press%20releases/pr042803. asp.
Source Code received by Rannoch Corp. from FAA, circa 1998.
"A Routine that converts an American Mode S address into its corresponding 'N' number string", Ken Banis, Feb. 17, 1992/.
"Description of the U.S. Algorithm for Assigning Mode A Addresses", Robert D. Grappel, M.I.T. Lincoln Laboratory, Nov. 1991.
"Program to convert Mode S address to U.S. Tail Number", R.D. Grappel, M.I.T. Lincoln Laboratory, 1991.
"Program to convert U.S. aircraft tail numbers to Mode S code", R.D. Grappel, M.I.T. Lincoln Laboratory, 1991.
"ADSE and Multilateration Mode-S Data Fusion for Location and Identification on Airport Surface", J.G. Herraro J.A. Portas, F.J. Rodriguez,(*IEEE 1999 Radar Conference Proceedings*, pp. 315-320, Apr. 20-22, 1999).
D.C. Rickard, D.J.Sherry, S.J.Taylor, "The development of a prototype aircraft-height monitoring unit utilising an SSR-based difference in time of arrival technique", International Conference Radar 92 (Conf. Publ. No. 365), 1992, p. 250-3.
D. E. Manolakis and C. C. Lefas, "Aircraft geometric height computation using secondary surveillance radar range differences," IEE Proceedings-F, Radar, Sonar, Navigation, vol. 141, No. 2, pp. 139-148, 1994.
Request for Proposal for Acquisition of Airport Noise and Operations Monitoring System (NOMS), Indianapolis Airport Authority, Oct. 21, 2003.
Technical Specifications, for Aircraft Flight Track and Noise Management System for the Regional Airport Authority of Louisville and Jefferson County, Harris Miller, Miller & Hanson Inc. 15 New England Executive Park Burlington, MA 01803 HMMH Report No. 298950, May 16, 2003.
"Overview of the FAA ADS-B Link Decision", John Scardina, Director, Office of System Architecture and Investment Analysis, Federal Aviation Administration, Jun. 7, 2002.
"Ground-Based Transceiver (GBT) for Broadcast Services Using the Universal Access Transceiver (UAT) Data Link", FAA-E-2973, Department of Transportation, Federal Aviation Administration, Jan. 15, 2004.
"Wide Area Multilateration Report on EATMP TRS 131/04 Version 1.1", NLR-CR-2004-472, Roke Manor, Nov. 2004.
J.G. Herrero, J. A. B. Portas, F.J.J. Rodriguez, J.R.C. Corredera, ASDE and Multilateration Mode-S Data Fusion for Location and Identification on Airport Surface, (*IEEE 1999 Radar Conf. Proc.*, pp. 315-320, Apr. 20-22, 1999).
D.C. Rickard, D.J. Sherry, S.J. Taylor, The development of a prototype aircraft-height monitoring unit utilizing an SSR-based difference in time of arrival technique, Int'l Conference Radar 92 (Conf. Publ. No. 365), 1992, p. 250-253.
D. E. Manolakis and C. C. Lefas, Aircraft geometric height computation using secondary surveillance radar range differences, IEE Proceedings-F, Radar, Sonar, Navigation, vol. 141, No. 2, pp. 139-148, 1994.
GPS Risk Assessment Study, Final Report, T.M. Corrigan et al., Johns Hopkins Univ., Applied Physics Laboratory, Jan. 1999.
Aircraft Noise Report, vol. 17, No. 1, Jan. 31, 200.
ASA MASPS—Change Issue, James Maynard, Oct. 21, 2002.
ADS-B, Automatic Dependent Surveillance—Broadcast Will ADS-B Increase Safety and Security for Aviation?, Mar. 1999, revised Jul. 2000, Darryl H. Phillips AirSport Corporation, 1100 West Cherokee Sallisaw OK 74955.
ASA MASPS—Change Issue, Greg Stayton, Aug. 1, 2002.
ASA MASPS—Change Issue, Michael Petri, Oct. 23, 2002.
ASA MASPS—Change Issue, J. Stuart Searight, Nov. 18, 2002.

ASA MASPS—Change Issue, Michael Petri, Dec. 16, 2002.
ASA MASPS—Change Issue, J. Stuart Searight, Jan. 23, 2003.
ASA MASPS—Change Issue, Tony Warren, Feb. 3, 2003.
ASA MASPS—Change Issue, Steve George, Apr. 23, 2003.
ASA MASPS—Change Issue, James Maynard, Apr. 23, 2003.
ASA MASPS—Change Issue, T.E. Foster, Jun. 11, 2003.
ASA MASPS—Change Issue, Jonathan Hammer et al., Jan. 13, 2004.
ASA MASPS—Change Issue, Tom Mosher, Jan. 13, 2004.
ASA MASPS—Change Issue, Mike Castle, Feb. 13, 2004.
ASA MASPS—Change Issue, Tony Warren, Sep. 10, 2004.
ASA MASPS—Change Issue, Mike Castle, Sep. 10, 2004.
ASA MASPS—Change Issue, Bob Smith, Sep. 1, 2004.
ASA MASPS—Change Issue, Heleberg and Kaliardos, Oct. 15, 2004.
ASA MASPS—Change Issue, Taji Shafaat, Sep. 19, 2004.
ASA MASPS—Change Issue, Stuart Searight, Nov. 3, 2004.
A Radar Substitute—David Hughes, Aviation Week & Space Technology, Mar. 7, 2005.
Statement of ACI-NA and AAAE on Airport Improvement Program Reauthorization before the Senate Aviation Subcommittee on Feb. 12, 1998. David Plavin.
Draft Proposal for the Amendment of the Sub-Cap on Off-Peak Takeoff and Landing Charges at Dublin Airport, Commission for Aviation Regulation, Nov. 23, 2003.
Aviation Infrastructure: Challenges Associated with Building and Maintaining Runways, General Accounting Office, GAO-01-90-T, Oct. 5, 2000.
Airfield Pavement: Keeping Nations Runways in Good Condition Could Require Substantially higher Spending, GAO/RCED-98-226, Jul. 1998.
Albany International Airport Pavement Management System, Albany, New York, Albany International Airport GIS-Based Pavement and Facilities Management , Fall, 2002.
Albany International Airport, New York, Uses GIS for Pavement Management, Lena Weber, Ph.D., GIS Manager, and Pat Rooney, GIS/GPS Technician, C.T. Male Associates, Summer, 2002, http://www.esri.com/news/arcnews/summer02articles/albany-airport.html.
Micropaver, Dr. M.Y. Shahin, CECER-CFF Champaign, IL May 2, 2005.
Raytheon Systems Limited Launches a Unique Solution for ADS-B,. Jan. 19, 2005, Raytheon Corp. http://www.raytheon.co.uk/highlights/ATMS.html.
Raytheon Systems Limited's ADS-B Solution Prized by International Air Traffic Authorities, Feb. 2, 2005 http://www raytheon.co.uk/news_room/news/press_02022005.pdf.
Boeing Subsidiary and Megadata Announce Joint Marketing Agreement, Press Release, Aug. 7, 2003.
Federal Airways & Airspace, Inc. Because Accuracy Matters, Feb. 2003, Jan. 2002.
VDL4 TM Alignment With DO-242A (RTCA ADS-B MASPS) WG51/SG2, NASA, Sep. 2003.
Method to Provide System-Wide ADS-B Back-Up, Validation, and Security, A. Smith et al. 25th AIAA/IEEE Digital Avionics Systems Conference, Oct. 15, 2006.
*Positive Identification of Aircraft on Surface Movement Area—Results of FAA Trials*, 10th Annual International AeroSense Symposium, Orlando, Florida, Apr. 1996.
*Surveillance Monitoring of Parallel Precision Approaches in a Free Flight Environment*, AIAA 16th Annual Digital Avionics Systems Conference, Oct. 1997.
*Analysis of ADS-B, ASDE-3 and Multilateration Surveillance Performance*—NASA Atlanta Demonstration Presented at the AIAA 17th Annual Digital Avionics Systems Conference in Oct. 1998.
*Application of ADS-B for Airport Surface Surveillance*, Daniel Hicok, Derrick Lee IEEE AIAA 17th Annual Digital Avionics Conference, 1998.
*Atlanta Hartsfield International Airport—Results of FAA Trials to Accurately Locate/Identify Aircraft on the Airport Movement Area*, IEEE Plans, Atlanta, GA, Apr. 1996.
*Evaluation of Airport Surface Surveillance Technologies*, IEEE Radar 96 conference, Beijing, China, Oct. 1996.

*Improved Location/Identification of Aircraft/Ground Vehicles on Airport Movement Areas—Results of FAA Trials*, Institute of Navigation in Santa Monica, CA, Jan. 1996.
*Sensis News*, http://www.sensis.com/docs/128/ © 1999-2006.
*Roke RADAR, Design and development of miniature radars and fuze sensors through to major radar programme builds*, http://www.roke.co.uk/skills/radar/, © 2006.
*Acoustic System for Aircraft Detection and Tracking, based on Passive Microphone Arrays*. Caronna, Rosello, Testa, 148th Meeting of the Acoustical Society of America, http://pcfite.ing.uniroma1.it/upload/research/4psp711079482021710.pdf Nov. 2004.
*Cel-Loc How We Do it, Technology Overview*, http://www.cell-loc.com/how_tech.html, Oct. 2, 2006 (original date unknown).
*Super-Radar, Done Dirt Cheap*, http://www.businessweek.com/magazine/content/03_42/b3854113.htm BusinessWeek Online, Oct. 20, 2003.
*Methods to Provide System-Wide ADS-B Back-Up, Validation and Security*, A. Smith, R. Cassell, T. Breen, R. Hulstrom, C. Evers, 25th AIAA/IEEE Digital Avionics Systems Conference, Oct. 15, 2006.
Damarel Systems International, Ltd, Travel Automation Specialists, © 2004, www.damarel.com.
Airfield Pavement Computer Software, Mar. 23, 2005, Transport Canada https://www.tc.gc.ca/CivilAviation/International/Technical/Pavement/software.htm.
ARA Transportation, © 2004, http://www.araworldwide.com/expertise/industry/transportation.htm.
*The Twilight Zone, Can Wide-Area Multilateration Systems Become A Nightmare for MSSR Producers?* Aircraft Traffic Technology International 2005, Vladimir Manda, Viktor Sotona.
*Safety, Performance, and Interoperability Requirements Document for ADS-B NRA Application*, European Organisation for Civil Avaiation Equipment, Dec. 2005.
Passive Surveillance Using Multilateration, Roke Manor Research website (2003).
Letter from Marc Morgan, SIEMENS, Feb. 10, 2006.
*Required Navigation Performance (RNP) and Area Navigation (RNAV)*, Boeing, Aug. 2000.
*System-Wide ADS-B Back-Up and Validation*, A. Smith, R. Cassell, T. Breen, R. Hulstrom, C. Evers, 2006 Integrated Communications, Navigation, and Surveillance Conference.
Required Navigation Performance (RNP) Another step towards global implementation of CNS/ATM, Anita Trotter-Cox, Assessment Compliance Group, Inc. Published in Professional Pilot Magazine, Jun. 1999.
Protest Letter dated May 16, 2002 from Otto M. Wildensteiner, U.S. Department of Transportation, Washington, DC.
"Comparison of Claims in U.S. Appl. No. 09/971,672 with Prior Art", May 16, 2002, Otto M. Wildensteiner, Department of Transportation, Washington, DC.
"Minimum Aviation System Performance Standards for Automatic Dependent Surveillance Broadcast (ADS-B)", RCTA, Inc. Washington, DC, 81998.
"Runway Incursion Reduction Program Dallas-Ft. Worth Formal Evaluation Report, Final Report", Trios Associates, Inc. Dec. 21, 2000.
"TIS-B DFW Application for Airport Surface Situational Awareness", Trios Associates, Inc., Sep. 6, 2000.
"A Prototype Transceiver for Evaluating an Integrated Broadcast Data Link Architecture", Chris Moody & Warrent Wilson, RCTA SC-186, Aug. 17, 1995, RTCA Paper No. 449-95/SC186-033.
"The Universal Access Transceiver (UAT)", Warren Wilson & Chris Moody, May 10, 1995.
"Terminal Area Productivity (TAP) Study Low Visibility Landing and Surface Operations (LVLASO) Demonstration Report" Surface Surveillance Products Team (AND-410) Sep. 4, 1998.
"Phase I—Operational Evaluation Final Report Cargo Airline Association ADS-B Program, FAA SafeFlight 21 Program" Apr. 10, 2000.
"Capstone Program Plan Version 1.0", Federal Aviation Administration, Mar. 10, 1999.
"TIS-B Concept and Approach", MITRE, Chris Moody, Feb. 29, 2000.

"RTCA Special Committee 186, Working Group 5 ADS-B UAT MOPS Meeting #2, Proposed Contents and Transmission Rates for ADS-B Messages" Chris Moody, MITRE Corp., Feb. 20, 2001.

"Airborne Information Initiatives: Capitalizing on a Multi-Purpose Broadcast Communications Architecture", R.C. Strain, J.C. Moody, E.C. Halm, B.E. Dunbar, S. Kavoussi, J.P. Mittelman, Digital Avionics Systems Conference, Oct. 1995.

"Minutes of SC-186 WG-2 (TIS-B) Meeting", Jun. 13-14, 2000.

"UK ADS-B in radar environment" (Mark Watson) http://www.eurocontrol.int/cascade/gallery/content/public/documents/Presentations/Session%20%202%20-%20Trials%20and%20Implementations/Watson%20-%20UK%20ADS-B%20in%20a%20radar%20environment.pdf (2006).

Ground Vehicle Operations on Airports, FAA Advisory Circular AC No. 150/5210-20 Jun. 21, 2002.

Airport Pavement Management Systems: An Appraisal of Erxisting Methodologies, Michel Gendreau and Patrrick Soriano;Pergamon Transn Res. A, vol. 32, No. 3, pp. 187-214, 1998.

*Components of a Pavement Maintenance Management System*, Mohamed Y. Shahin, U.S. Army Construction Engineering Research Laboratory, Transportaiton Research Record 791, pp. 31-39, 1980.

*Application of Markov Process to Pavement Management Systems at the Network Level*, Abbas Ahmad Butt, University of Iillinois at Urbana-Champaign (1991).

Need for Accurate Traffic Data in Pavement Management, John F. Kennedy International Airport Case Studt, Keegan, Handojo, Rada, MACTEX Engineering and Consulting, Inc, 2004 FAA Worldwide Airport Technology Transfer Conference, Apr. 2004.

PCL system with illuminator of opportunity, Huaiying tan, Min ren, Bo lie, Jinning Song, Beijing Radar Instiitute, IEEE 0-7803-9582-4/06, Apr. 2006.

High Accurate Multiple Target Detection in PCL Radar Systems; Jafargholi, A. Mousavi, M. R. Nayebi, M. M. K. N. Toosi University of Technology Department of Electrical Engineering, Tehran, Iran; Radar, 2006. CIE '06. International Conference on, Oct. 2006, Shanghai, China; ISBN: 0-7803-9583-2.

Denial of bistatic hosting by spatial-temporal waveform design; H.D. Griffiths, M.C. Wicks, D. Weinder, R. Adve, P.A. Antonik, and I. Fotinopoulos, IEE Proc. Radar Sonar Navig., vol. 152, No. 2, Apr. 2005.

Passive coherent location FPGA implementation of the cross ambiguity function; Kvasnicka, M. Hermanek, A. Kunes, M. Pelant, M. Plsek, R., Proceedings—SPIE the International Society for Optical Engineering; 2006, vol. 6159; Part 1, pp. 615918; International Society for Optical Engineering.

Passive coherent location system simulation and evaluation, Proc. SPIE, vol. 6159, 615917 (2006); DOI:10.1117/12.675065 , Apr. 26, 2006 ; Conference Title: Photonics Applications in Astronomy, Communications, Industry, and High-Energy Physics Experiments IV Libor Slezák, and Michal Kvasnicka, Martin Pelant, and Jir Vávra *ERA a.s.* (Czech Republic) Radek Plsek *Technical Univ. of Pardubice* (Czech Republic).

World Airport Week, "Sharing Makes the Airport Go Round" Jan. 21, 1997, p. 1.

Huaiying Tan et al. *PCL System With Illuminator of Opportunity* Proceedings of 2006 CIE International Conference on Radar, vol. 1,Oct. 16, 2006.

Griffiths H D et al., *Denial of Bistatic Hosting by Spatial-Temporal Waveform Design* IEE Proceedings: Radar, Sonar & Navigation, Institution of Electrical Engineers, GB, vol. 152, No. 2, Apr. 8, 2005.

Jafargholi et al, *High Accurate Multiple Target Detection in PCL Radar Systems*, RADAR, 2006, CIE '06. International Conference on, IEEE, PI, Oct. 1, 2006.

TRANSMITTER INDEPENDENT TECHNIQUES TO EXTEND THE PERFORMANCE OF PASSIVE COHERENT LOCATION

CROSS-REFERENCE TO RELATED APPLICATIONS

This application is a Continuation-In-Part of U.S. patent application Ser. No. 11/492,711, filed Jul. 25, 2006 now U.S. Pat. No. 7,429,950, and incorporated herein by reference; This application is a Continuation-In-Part of U.S. patent application Ser. No. 11/429,926, filed on May 8, 2006 now U.S. Pat. No. 7,477,193, and incorporated herein by reference; This application is a Continuation-In-Part of U.S. patent application Ser. No. 11/343,079, filed on Jan. 30, 2006 now U.S. Pat. No. 7,375,683, and incorporated herein by reference; This application is also a Continuation-In-Part of U.S. patent application Ser. No. 11/342,289 filed Jan. 28, 2006 now U.S. Pat. No. 7,576,695 and incorporated herein by reference; This application is a Continuation-In-Part of U.S. patent application Ser. No. 11/209,030, filed on Aug. 22, 2005 now U.S. Pat. No. 7,248,219, and incorporated herein by reference; This application is a Continuation-In-Part of U.S. patent application Ser. No. 11/257,416, filed on Oct. 24, 2005 now U.S. Pat. No. 7,495,612, and incorporated herein by reference; This application is a Continuation-In-Part of U.S. patent application Ser. No. 11/203,823 filed Aug. 15, 2005 now U.S. Pat. No. 7,739,167 and incorporated herein by reference; This application is a Continuation-In-Part of U.S. patent application Ser. No. 11/145,170 filed on Jun. 6, 2005 now U.S. Pat. No. 7,437,250 and incorporated herein by reference; application Ser. No. 11/145,170 is a Continuation-In-Part of U.S. patent application Ser. No. 10/743,042 filed Dec. 23, 2003 now U.S. Pat. No. 7,132,982 and incorporated herein by reference; application Ser. No. 10/743,042 is a Continuation-In-Part of U.S. patent application Ser. No. 10/638,524 filed Aug. 12, 2003 now U.S. Pat. No. 6,806,829 and incorporated herein by reference; application Ser. No. 10/638,524 is a Continuation of U.S. patent application Ser. No. 09/516,215 filed Feb. 29, 2000 now U.S. Pat. No. 6,633,259 and incorporated herein by reference; application Ser. No. 09/516,215 claims is a Non Prov. of Provisional U.S. Patent Application Ser. No. 60/123,170 filed Mar. 5, 1999 and incorporated herein by reference; application Ser. No. 10/743,042 is a Continuation-In-Part of U.S. patent application Ser. No. 10/319,725 filed Dec. 16, 2002 now U.S. Pat. No. 6,812,890, and incorporated herein by reference. Application Ser. No. 10/743,042 is a Non Prov. of Provisional U.S. Patent Application Ser. No. 60/440,618 filed Jan. 17, 2003 and incorporated herein by reference; The present application is also a Continuation-In-Part of U.S. patent application Ser. No. 11/649,350, filed Jan. 3, 2007, and incorporated herein by reference.

FIELD OF THE INVENTION

The present invention relates to aircraft tracking. In particular, the present invention is directed toward transmitter independent techniques to extend the performance of passive coherent location.

BACKGROUND OF THE INVENTION

With a conventional radar system, a pulsed signal is transmitted and the time taken for the pulse to travel to the object and back allows the range of the object to be determined. In a passive radar system, there is no dedicated transmitter. Instead, the receiver uses third-party transmitters and measures the time difference of arrival (TDOA) between the signal arriving directly from the transmitter and the signal arriving via reflection from the object, allowing the bi-static range of the object to be determined. In addition to bi-static range, passive radar can also measure the bi-static Doppler shift of the echo and also its direction of arrival allowing the location, heading and speed of the object to be calculated. In some cases, multiple transmitters and receivers are used to make several independent measurements of bi-static range, Doppler and bearing and hence significantly improve the final track accuracy.

The Passive Coherent Location (PCL) system is bi-static radar, which measures the elliptical distance and the Doppler frequency shift. It works with continuous wave (CW) transmitters of opportunity, meaning that it uses electromagnetic radiation, primarily assigned for another purpose, for example, radio or television terrestrial broadcasts. It is necessary to detect at least two (in an ideal case three or more) direct signals from transmitters for a proper determination of a target position.

As of December 2006, there are several PCL systems in various stages of development or deployment, including:

Silent Sentry is a Lockheed Martin (USA) PCL system that uses FM radio transmissions. Two different antenna variants are believed to be available providing an antenna that provides 360° azimuth coverage from 4 different beams (an Adcock array), and a variant that provides 100° azimuth coverage from six different beams (linear array). It has a range of up to around 100 nautical miles depending on the variant employed and a number of receive nodes at different locations can be combined to provide increased coverage. See, http://www.dtic.mil/ndia/jaws/sentry.pdf, incorporated herein by reference.

Celldar is a British system developed jointly by Roke Manor and BAE Systems. The system is a PCL sensor that can exploit GSM signals, currently in the 900 MHz band, but may also be able to use the 900 MHz and 1800 MHz bands simultaneously in the future. It is believed that Celldar is a low level/surface surveillance system designed to achieve good coverage below 10,000 ft and can track targets in 2D over a 100° sector at ranges of up to around 60 km. See, http://www.roke.co.uk/skills/radar/, incorporated herein by reference.

CORA is a German PCL sensor, developed by FGAN (Die Forschungsgesellschaft für Angewandte Naturwissenschaften e.V.), that exploits Digital Video Broadcast-Terrestrial (DVB-T) and Digital Audio Broadcast (DAB) transmissions.

Cristal is a PCL sensor developed by Thales that exploits FM radio transmissions to track targets. In addition to Cristal, it is believed that Thales has a prototype PCL system that uses analog TV or DAB transmissions.

One of the PCL systems developed by ERA, formerly Rannoch Corporation, (www.rannoch.com) uses FM radio transmissions.

Each of these systems rely on continuous wave (CW) communications whether or not the CW signal is modulated to provide analog or digital information, as the techniques basically rely on the comparison of delayed versions of the source (i.e., the reflections) with the original CW signal. For example, analog signals include conventional FM radio or television, while digitally encoded signals include new television formats for audio, video, and telecommunications (e.g., DAB, DVB, and GSM).

U.S. Pat. No. 7,155,240, entitled "Method of Determining the Position of a Target Using Transmitters of Opportunity," (Atkinson et al.), and incorporated herein by reference, describes a technique for non-reliance on line of sight with a digital source signal such as GSM. That technique claims a method of determining the position of a target using components in a wireless communication system in which pre-stored codes are included in transmissions of communications signals as part of a communication protocol, comprising the steps of: a) providing a transmitter which transmits a communications signal; b) providing a plurality of receivers, in communication with each other, which receive communications signals reflected from the target, the receivers being disposed at locations which are separate from the transmitter and separate from each other, and being time or phase synchronized; c) determining a time of arrival information of the received communications signal at each receiver by continuously correlating the code in the received communications signal with the pre-stored codes in the receiver; and d) using information pertaining to the location of each receiver, together with the information obtained from step c), to determine the target position.

In essence, the technique described by Atkinson et al uses a priori information relating to digital encoded signals where the receiver essentially identifies embedded data formats such as headers, lead-ins, or other recognizable formats. The technique appears to have been developed with digital communications in mind, and is not described for older analog transmission such as conventional television, FM radio, or other analog signals. Essentially, Atkinson's patent relies on unique or known characteristics contained within the raw digital data encoding of the transmitted signal for time or phase referencing.

SUMMARY OF THE INVENTION

The present invention is directed toward methods to improve the performance of passive coherent location by non-reliance on a direct view of the signal source. Passive Coherent Location, or PCL, has become a promising technology as more computer processing power has become generally available. Basically, most PCL techniques rely on comparing signal sources with their reflections from an object in order to determine the location of the object. However, this requires line of sight access from the receiver system to the signal source which may not always be practical and may limit the performance of the system overall. The techniques described herein do not require line of sight to the transmitter sources.

DETAILED DESCRIPTION OF THE INVENTION

Figure 1:
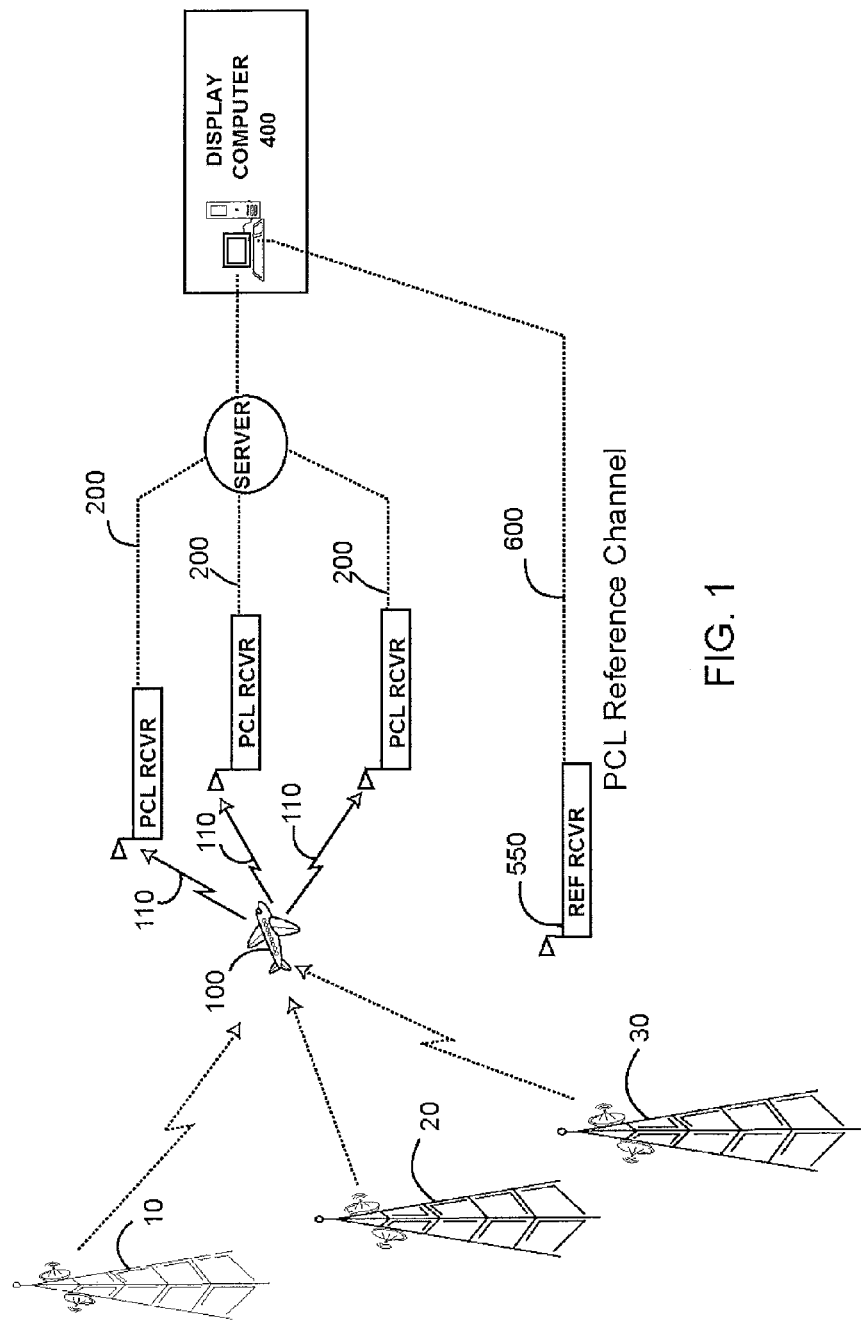
FIG. 1 is a block diagram of a first embodiment of the present invention, illustrating establishing References from a Source Signal's Characteristics.

FIG. 1 is a block diagram of a first embodiment of the present invention, illustrating establishing References from a Source Signal's Characteristics. Referring to FIG. 1, this embodiment shows several FM transmitters 10, 20, 30 where the signals are reflected from an aircraft 100 and are received at multiple PCL receiver locations 110, 150.

Unlike conventional PCL, there is no direct line of sight from a reference channel 550, 600 to the transmitters 10, 20, 30. Instead, at receiver locations 150, time references for each of the signals are established through analysis of the reflected signals, such as analog television information patterns, FM modulation characteristics, or through signal characterization and processing, including spectral analysis, of the signals in real time, or near real time with quantifiable known delays such as those associated with gate array technology.

The time-stamped signals are then forwarded 200 to a central server 250 for PCL processing including detection, correlation, feature extraction, and line tracking, and then sent for display 300 or forwarding for integration with other surveillance systems.

This embodiment is essentially a distributed timing system, where timing references are established at the receivers 150.

Figure 2:
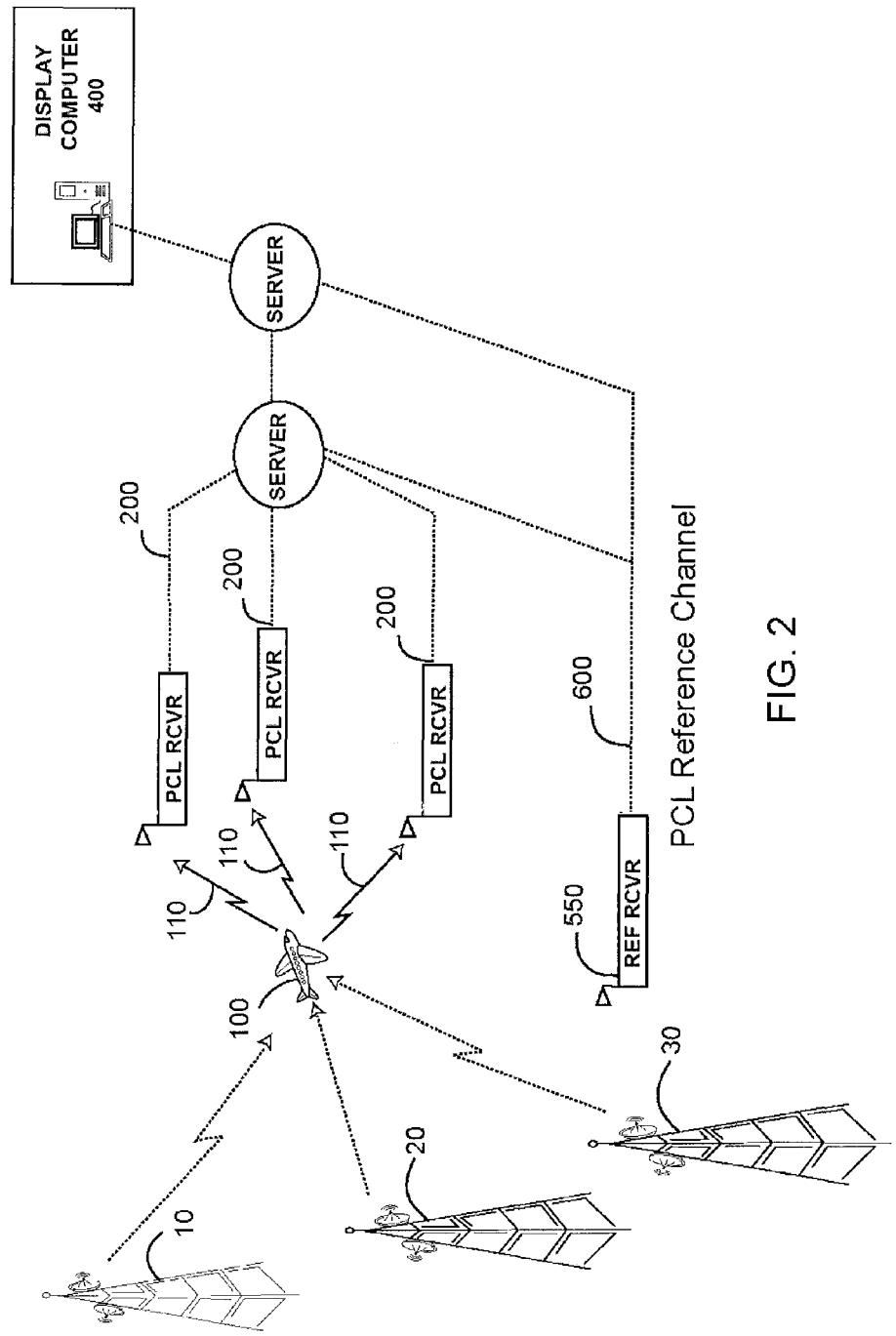
FIG. 2 is a block diagram of a second embodiment of the present invention, illustrating the relative Comparison of Reflected Signals.

FIG. 2 is a block diagram of a second embodiment of the present invention, illustrating the relative Comparison of Reflected Signals. Referring to FIG. 2, this embodiment shows several FM transmitters 10, 20, 30 where the signals are reflected from an aircraft 100 and are received at multiple PCL receiver locations 110, 150.

Again, unlike conventional PCL, there is no direct line of sight from a reference channel 550, 600 to the transmitters 10, 20, 30.

Instead at receiver locations 150, signals are down-converted, as in conventional multilateration, into video equivalent signals, which are passed along media 200 sufficient to provide the necessary bandwidth. For example, appropriate media includes fiber or radio link.

This embodiment shows a high-level two-step process at the central server. Firstly the incoming signals are matched to determine which reflected signals apply to each target, taking into account Doppler effects, and secondly for timing, detection, correlation, feature extraction, and line tracking, and then sent for display 400 or forwarding for integration with other surveillance systems.

This embodiment is essentially a centralized timing system where the timing is established through relative signal comparison at the central server 300.

Figure 3:
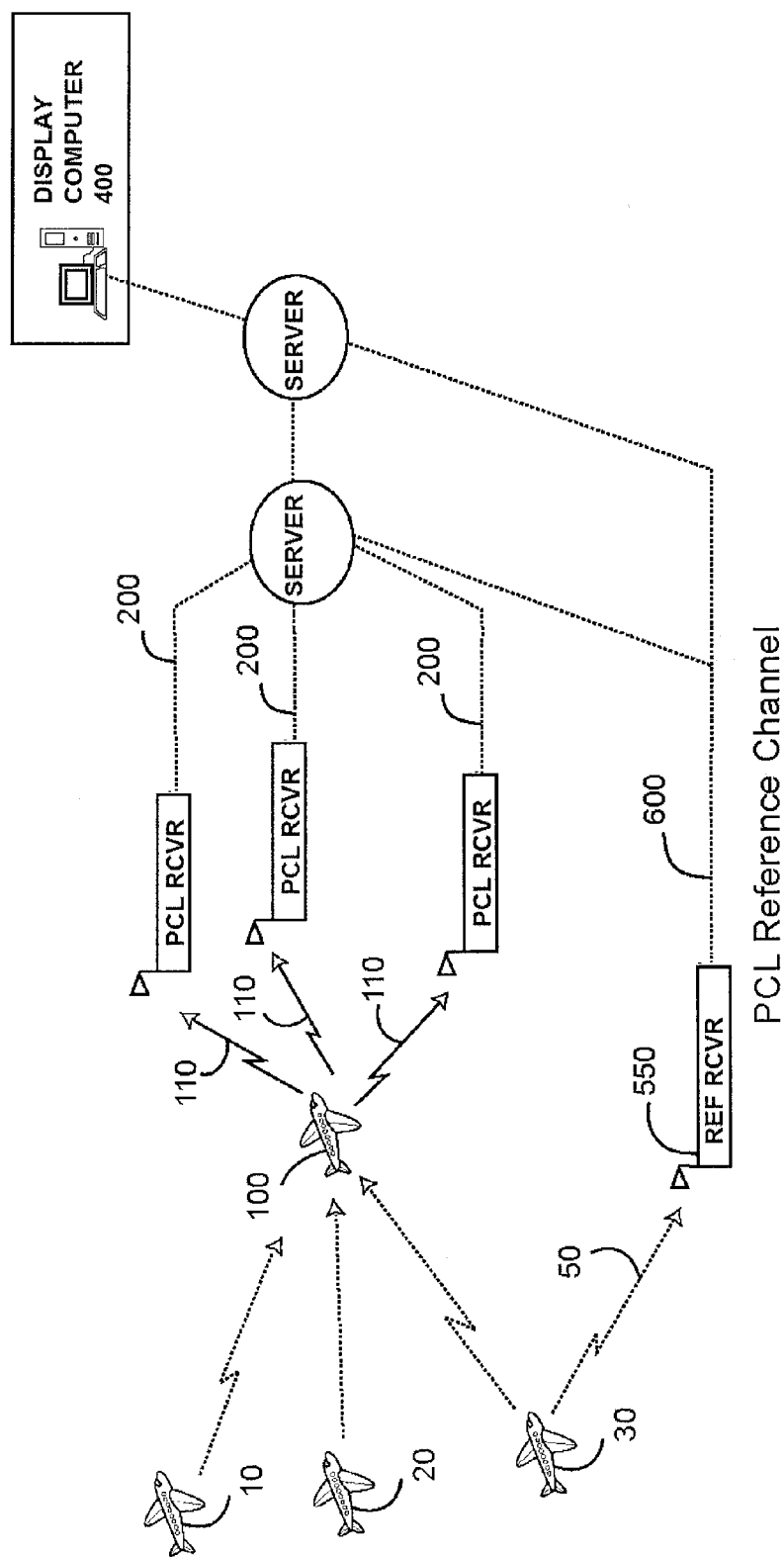
FIG. 3 is a block diagram of a third embodiment of the present invention, illustrating the use of Mobile Transmission Sources.

FIG. 3 is a block diagram of a third embodiment of the present invention, illustrating the use of Mobile Transmission Sources. Referring to FIG. 3, this embodiment shows several aircraft-based transmitters 10, 20, 30 where the signals are reflected from an aircraft 100 and are received at multiple PCL receiver locations 110, 150. In this case there is line of sight to some or all of the aircraft based transmitters and the reference channel 50, 550, 600 to the transmitters 10, 20, 30.

Typical aircraft transmitters 10, 20, 30 may include CW or pulse systems, such as collision avoidance system, Mode S, or ADS-B transponders, which constantly transmit in typical airspace. Other than the mobile aspect of the transmitters, the PCL can operate in a conventional fashion with line of sight to the transmitters or decoding can be accomplished as in embodiments 1 and 2 above.

Thus, it is possible to use unique or identifiable reference information from any type of signal, whether digital or analog, which may be identifiable from the raw signal or from data reduction and analysis of the signal.

One of the issues with continuous wave tracking techniques is the sheer volume of data and processing power required to characterize and analyze signals. Therefore, it is necessary to consider various methods to reduce the data into salient characteristics for the purpose of comparison and characterization. For example, FM radio characteristics of interest over the typical FM frequency range of 88 MHz to 108 MHz include modulation depth, modulation frequency deviation, and other characteristics such as peak and semi-peak values.

In addition to using reference characteristics of waveforms for time referencing it is also possible to compare only signal reflections from a common source, even with the coherent source to perform positioning using time difference of arrival techniques.

Two separate methods are 1) use of unique signal characteristics to use as a time or phase reference or 2) comparison of reflected versions of the same source.

Therefore, in either of the two cases, it is possible to use the original CW information, or to use a characterization of the signal, such as a Fast Fourier Transform (FFT) or other characterization of the signal as described in the following publications which are incorporated herein by reference: Slezák, L., Kvasnička, M., Pelant, M., Vávra, J., Plšek, R.: Simulation and Evaluation of the Passive Coherent Location system. In Proc. International Radar Symposium 2005, Berlin 200; and Kvasnička, M., Heřmánek, A., Pelant, M., Plšek, R.: Passive Coherent Location FPGA implementation of the Cross Ambiguity Function. In Proc. Signal Processing Symposium 2005, Wilga 2005.

A significant part of PCL processing is cross ambiguity function (CAF) computation and its decomposition into clutter and target components. The target CAF component is analyzed via a sequential target elimination process. As a result, the parameters defined for each detected target are: instantaneous bi-static RCS, ground clutter estimation, elliptical range and velocity, elliptical acceleration and RCS change during the integration period.

Figure 4:
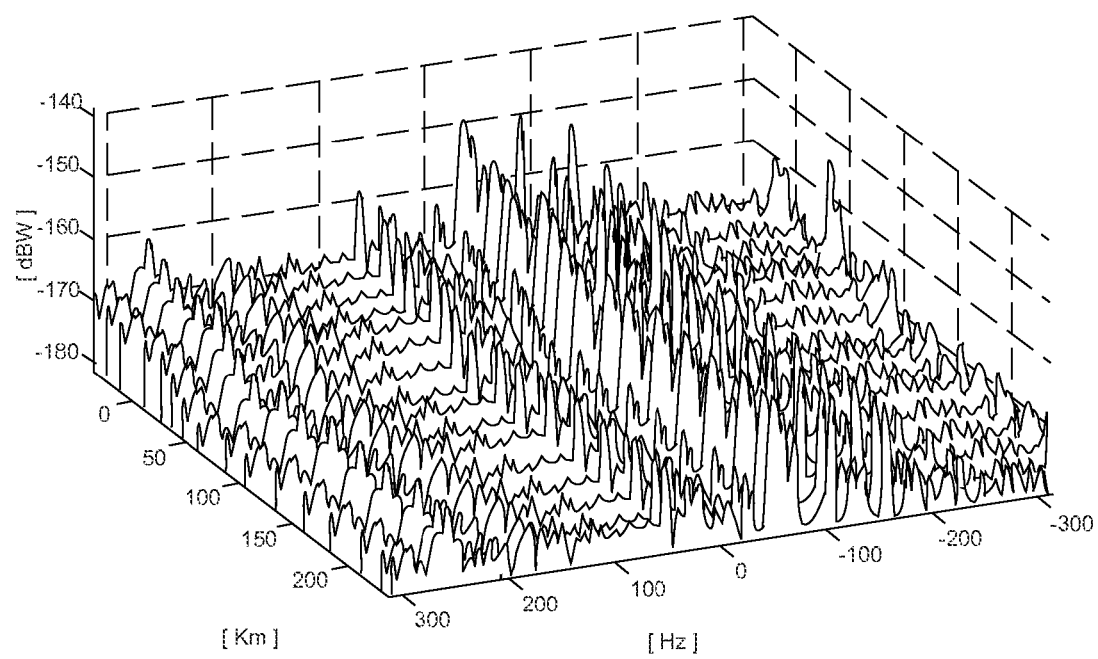
FIG. 4 is a diagram illustrating CAF for Direct and Scattered FM Signals (time delay τ transformed to range in km).

A sufficiently fast and reliable computation of the cross ambiguity function (CAF) is one of the most important tasks and also a computationally time consuming part of PCL processing. FIG. 4 illustrates—CAF for Direct and Scattered FM Signals (time delay τ transformed to range in km) Plšek et al define the Cross Ambiguity Function (CAF) mathematically as:

$$CAF(\tau, f) = \int_0^T s_1(t) s_2^*(t+\tau) e^{-j2\pi ft} dt \qquad (1)$$

where $s_1$ and $s_2$ are continuous-time signals in the analytic signal complex format, T is the integration period (or interval) in seconds, τ is the time delay in seconds, and f is the Doppler frequency offset in Hertz.

In order to shift equation (1) into the discrete or sampled time domain, let $t=nT_S$ and $$f = \frac{kf_s}{N},$$

where $T_S$ is the sample period, $$f_s = \frac{1}{T_s}$$

is the sampling frequency, n represents individual sample numbers, and N is the total number of samples. Inserting these values into eq. (1) and simplifying yields the discrete form of the CAF:

$$CAF(\tau, k) = \sum_{n=0}^{N-1} s_1(n) s_2^*(n+\tau) e^{-j2\pi \frac{kn}{N}} \qquad (2)$$

where $s_1$ and $s_2$ are the discrete-time (sampled) signals in the analytic signal complex format, N is the total number of samples in $s_1$ and $s_2$, τ is the time delay in samples, and $$\frac{k}{N}$$

is the frequency difference in digital frequency, or a fraction of the sampling frequency. The magnitude of the CAF (τ,k), or |CAF (τ,k)|, will peak when τ and $$\frac{k}{N}$$

are equal to the embedded TDOA (Time Difference of Arrival) and FDOA (Frequency Difference of Arrival), respectively, between the signals $s_1$ and $s_2$. Note that CAF (τ,k) is also capable of a signal detection due to the fact that the presence of peaks in the CAF (τ,k) may be used as a robust signal detector, even for signals with extremely low SNR.

Computational efficiency becomes a large factor because of the potentially wide range of TDOAs and FDOAs that must be searched. Equation (2) can uncover TDOAs in the range:

$$-N \le \tau \le N \text{ and } FDOAs \text{ for } k \text{ in the range } -\frac{N}{2}+1 \le k \le \frac{N}{2}.$$

To search the entire range of possible TDOAs and FDOAs would require $2N^2$ calculations of the CAF, which is an ominous task for large N or equivalently for long integration interval T.

The optimal algorithm for effective CAF computation is a direct application of the Fast Fourier Transform (FFT) into the signal product of the signals $s_1$ and $s_2$, $$CAF(\tau, k) = FFT(s_1(n) s^*_2(n+\tau)) \qquad (3)$$

Using eq. (3) to calculate CAF for all values of τ and k, an individual FFT computation is required for each value of τ.

One method for a fast and robust CAF calculation is a hardware implementation of the direct FFT method. Another way to perform these tasks is to deploy a cluster of computers with high-speed network interconnections and an appropriate number of computing nodes.

The basic requirements for CAF calculation in PCL signal processing are as follows:
Sampling frequency: 100-200 kHz
Effective bit resolution (dynamic range) for input signals: 18-24 bits (~100 dB)
Total number of samples or integration interval: $2^{17}$=131 072 samples or about 1 sec
Frequency resolution: <1 Hz
Accuracy of CAF calculation: absolute error about $10^{-9} \div 10^{-12}$ with comparison to IEEE 64-bit floating-point arithmetic
Maximum number of time delays: <1024
Maximum frequency range: $\langle -300, +300 \rangle$ Hz (about 600 spectral coefficients)
Total time of computation: <1 sec (final requirements is about 10 ms for real time PCL system)

This computational task is extremely challenging due to the sheer volume of input data and the need for high accuracy of the CAF computation.

Figure 5:
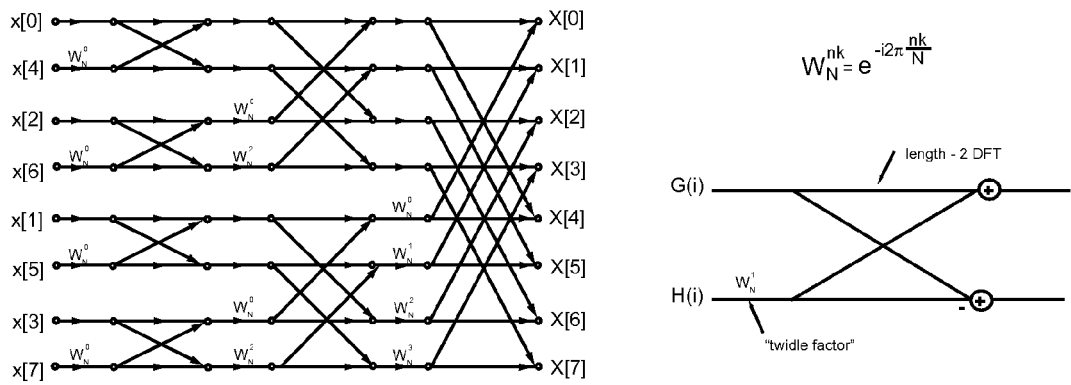
FIG. 5 is a diagram illustrating an Eight-Point FFT-Radix2 and Elementary Butterfly Operation.

The basic part of the CAF computation algorithm is a radix-2 implementation of the general FFT algorithm. The theoretical computational complexity of this algorithm is $O(N \log_2 N)$ operations (compare with $O(N^2)$ for a standard DFT). FIG. 5 shows the basic computational Eight Point FFT-radix-2 structure in terms of elementary "butterfly" operations.

More effective implementations of the FFT exist, such as radix-4 and split-radix but they are significantly more complicated to implement, and this example is restricted to radix-2 for the purposes of discussion and presentation.

Figure 6:
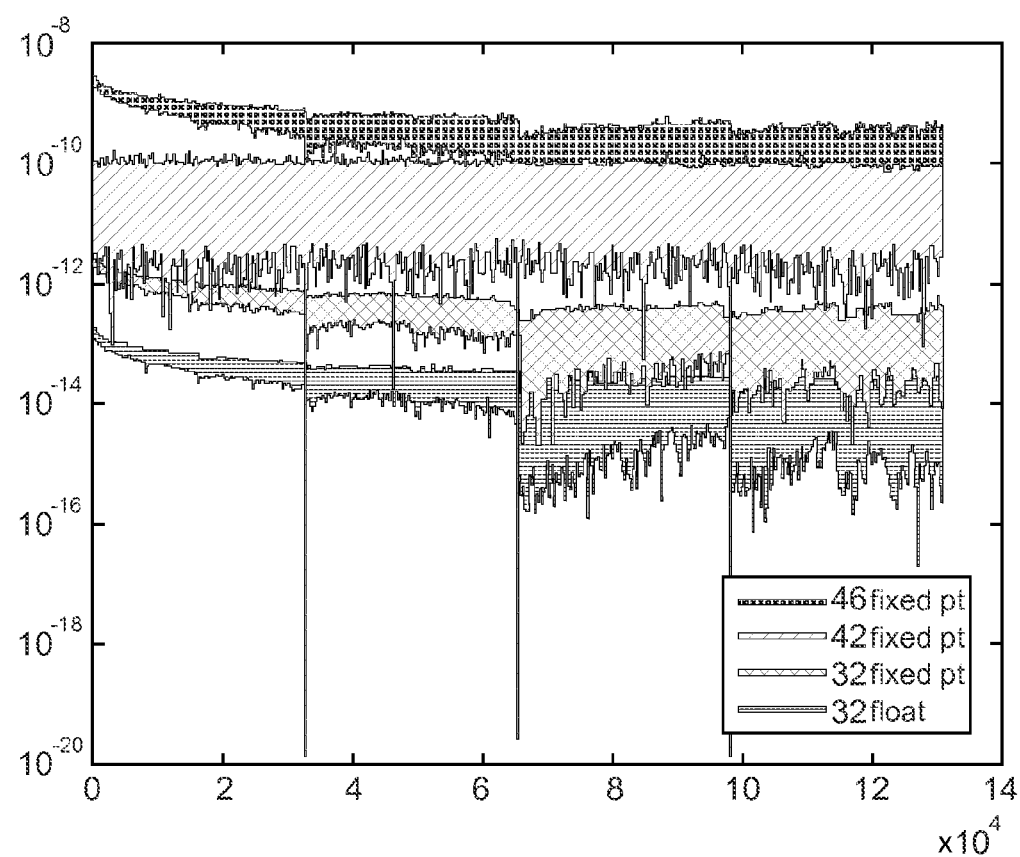
FIG. 6 illustrates an FFT-radix2 Error for N=$2^{17}$ Samples for Different Arithmetic Representations.

A practical approach to FFT/CAF implementation is significantly influenced by the arithmetic representation (fixed or floating-point) and numerical accuracy. As an optimal arithmetic representation, a fixed-point numerical representation with 42-46 bit accuracy may be employed as illustrated in FIG. 6. FIG. 6 illustrates an FFT-radix2 Error for N=$2^{17}$ Samples for Different Arithmetic Representations.

Figure 7:
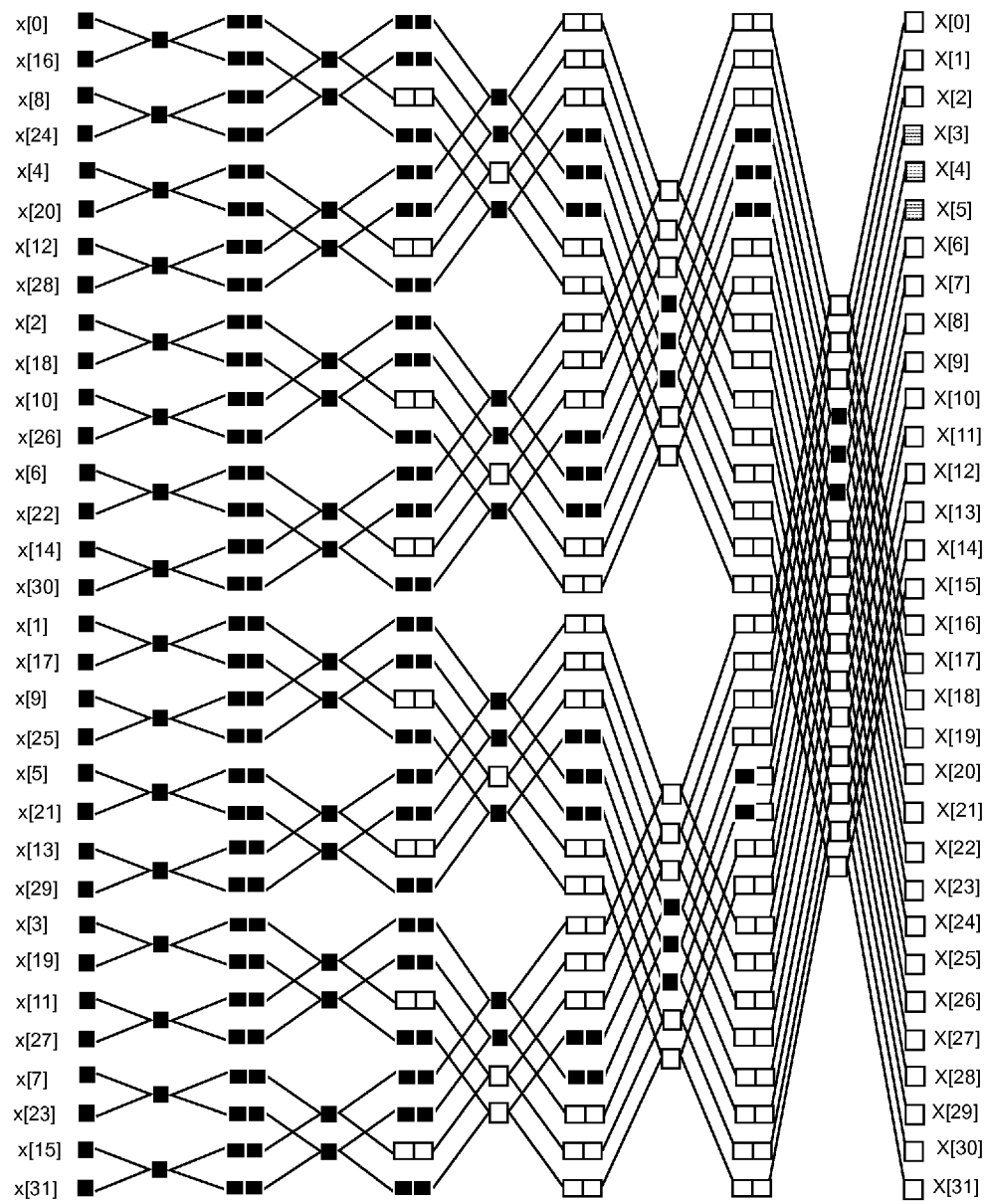
FIG. 7 is a diagram illustrating an FFT-radix2 Butterfly Reduction for N=$2^5$ Samples using 4 Spectral Coefficients.

For limited frequency ranges, e.g., $\langle -300, +300 \rangle$ Hz, which represents only about a 1% fraction of the frequency range up to the Nyquist frequency, the number of operations may be reduced significantly. FIG. 7 illustrates an example of a "butterfly" reduction, which is not necessary for FFT calculation for limited frequency ranges. It is possible to obtain a modified FFT-radix2 algorithm with about 62% reduction of the required "butterfly" operations.

While the preferred embodiment and various alternative embodiments of the invention have been disclosed and described in detail herein, it may be apparent to those skilled in the art that various changes in form and detail may be made therein without departing from the spirit and scope thereof.

I claim:

1. A method of tracking a target using passive coherent location, comprising the steps of:
receiving, at a plurality of receivers, reflections of radio signals from target, the radio signals being generated by one or more of uncontrolled or controlled transmitter sources, at least one or more of the plurality of receivers not in a line-of-sight to the transmitter sources,
identifying the reflections of the radio signals as reflections from the target;
analyzing the reflections of the radio signals by one or more of analyzing analog television information patterns, analyzing FM modulation characteristics, and through spectral analysis of the reflections of the radio signals to determine a transmitter source,
measuring a time difference of arrival of the reflections of the radio signals at the plurality of receivers, and
determining target position from the time difference of arrival of the reflections of the radio signals.

2. The method of claim 1, wherein the radio signals comprise one or more of digitally and analog encoded radio signals.

3. The method of claim 1, wherein the radio signals comprise one or more of analog television and digital television.

4. The method of claim 1, wherein the radio signals comprise one or more of FM radio, analog television, Digital Video Broadcast Terrestrial (DVB-T), Digital Audio Broadcast (DAB), and the Global System for Mobile Communications (GSM).

5. The method of claim 1, wherein the step of identifying reflections of radio signals as a reflection from the target comprises the step of applying pattern recognition to the reflections of the radio signals using a distributed timing information system at the plurality of receivers.

6. The method of claim 1, wherein the step of identifying reflections of radio signals as a reflection from the target comprises the step of comparing reflections of the radio signals using a centralized timing information system at a central server.

7. The method of claim 1, wherein the radio signals are transmitted from one or more of fixed or mobile radar, transponders, navigation equipment, weather system, or communications systems.

8. A system for tracking a target reflecting radio signals, the system comprising:
a plurality of receivers receiving reflections of radio signals from target, the radio signals being generated by one or more of uncontrolled or controlled transmitter sources, one of the plurality of receivers not being in line-of-sight with one or more of the uncontrolled or controlled transmitter sources,
a detector identifying reflections of radio signals reflected from the target and measuring a time difference of arrival of the reflections of the radio signals at the plurality of receivers,
an analyzer analyzing the reflections of the radio signals by one or more of analyzing analog television information patterns, analyzing FM modulation characteristics, and through spectral analysis of the reflections of the radio signals to determine a transmitter source, and
a calculator for determining target position from the time difference of arrival of the reflections of the radio signals.

9. The system of claim 8, wherein the detector identifies reflected radio signals from the target using one or more of pattern recognition in the reflected signals and analyzed reflected signals in a distributed timing information system, created at the receivers.

10. The system of claim 8, wherein the detector identifies reflected radio signals from the target by comparing the reflected signals at a centralized timing information system at a central server.

11. The system of claim 8, wherein the radio signals comprise one or more of FM radio, analog television, Digital Video Broadcast Terrestrial (DVB-T), Digital Audio Broadcast (DAB), and the Global System for Mobile Communications (GSM).

12. The system of claim 8, wherein the radio signals are transmitted from one or more of fixed or mobile radar, transponders, navigation equipment, weather system, or communications systems.

* * * * *